United States Patent
Shimura

(10) Patent No.: US 6,499,069 B1
(45) Date of Patent: Dec. 24, 2002

(54) INTERFACE APPARATUS AND METHOD, AND IMAGE OUTPUT APPARATUS HAVING INTERFACE APPARATUS

(75) Inventor: Akihiro Shimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 09/716,427

(22) Filed: Nov. 21, 2000

Related U.S. Application Data

(62) Division of application No. 08/755,369, filed on Nov. 25, 1996, now Pat. No. 6,212,583.

(30) Foreign Application Priority Data

Jan. 16, 1996 (JP) ............................................. 8-004876

(51) Int. Cl.$^7$ .......................... G06F 13/12; G06F 13/38
(52) U.S. Cl. .......................... 710/62; 710/63; 710/64; 710/65; 358/1.13; 358/1.15
(58) Field of Search ............................ 710/62, 63, 64, 710/65; 326/30, 68, 83; 358/1.13, 1.15

(56) References Cited

U.S. PATENT DOCUMENTS

| | | | |
|---|---|---|---|
| 3,747,071 A | 7/1973 | Haynes | 340/172.5 |
| 3,959,776 A | 5/1976 | Morley | 340/172.5 |
| 4,029,006 A | 6/1977 | Mercer | 101/35 |
| 4,452,136 A | 6/1984 | Boynton et al. | 101/93.5 |
| 4,926,347 A | 5/1990 | Uchida et al. | 364/519 |
| 4,992,957 A | 2/1991 | Aoyama et al. | 364/519 |
| 5,067,832 A | 11/1991 | Baur et al. | 400/66 |
| 5,228,118 A * | 7/1993 | Sasaki | 358/1.13 |
| 5,302,947 A | 4/1994 | Fuller et al. | 340/825.34 |
| 5,321,819 A | 6/1994 | Szczepanek | 395/325 |
| 5,608,639 A * | 3/1997 | Twardowski et al. | 700/125 |
| 5,720,560 A | 2/1998 | Nozawa | 400/54 |
| 5,790,640 A * | 8/1998 | Tassa et al. | 379/100.15 |

* cited by examiner

Primary Examiner—Ayaz Sheikh
Assistant Examiner—Frantz B. Jean
(74) Attorney, Agent, or Firm—Fitzpatrick, Cella, Harper & Scinto

(57) ABSTRACT

An interface apparatus capable of appropriate connection with external devices having various specifications. Control signal DRVSEL is used for setting output method of a signal from output circuit 801 to an open-collector drive or a totem-pole drive. 3-State buffer 904 which drives a communication path comes into high-impedance status when its enable input is at a H level, on the other hand, when the enable input is at a L level, drives its output with the same logic as that of AND gate output. When the signal DRVSEL is at the L level, the 3-state buffer 904 drives the output only when its internal signal is at the L level, thus output is made in the open-collector drive. On the other hand, when the signal DRVSEL is at the H level, the 3-state buffer 904 drives the output with the same logic as that of its internal signal, thus output is made in the totem-pole drive.

49 Claims, 16 Drawing Sheets

FIG. 15

| DRVSEL ⟨1⟩ | DRVSEL ⟨0⟩ | COMMUNICATION MODE |
|---|---|---|
| 0 | 0 | OPEN-COLLECTOR / 5V |
| 0 | 1 | OPEN-COLLECTOR / 3.3V |
| 1 | 0 | TOTEM-POLE / 5V |
| 1 | 1 | TOTEM-POLE / 3.3V |

INTERFACE APPARATUS AND METHOD, AND IMAGE OUTPUT APPARATUS HAVING INTERFACE APPARATUS

This application is a division of application Ser. No. 08/755,369 filed on Nov. 25, 1996 U.S. Pat. No. 6,212,583.

BACKGROUND OF THE INVENTION

This invention relates to an interface apparatus and method and an image output apparatus having the interface apparatus and, more particularly to an interface apparatus for transmitting/receiving information with an external apparatus via a communication line, a method for negotiating for transmitting/receiving information between apparatuses, and an image output apparatus having the interface apparatus.

Generally, a printer and an information processing device are connected via a fixed type communication interface. In each device, an open-collector type interface circuit or totem-pole type interface circuit is fixedly provided, and it is impossible to select an interface circuit in accordance with the specification of communication destination device.

However, in a case where a device has only an open-collector type interface circuit, even if another device as a communication destination uses a totem-pole type interface, high-speed communication cannot be performed. In an open-collector type interface circuit, a transitional period where a signal level changes from a high level to a low level, and a transitional period where the signal level changes from the low level to a high level are greatly different. Especially, the transition of signal level from the low level to the high level is made very slowly.

In a case where the device has only a totem-pole type interface circuit, if the power of the communication destination device is turned off and the communication line is in short-circuit or in low-impedance status, overcurrent occurs, which consumes a large amount of electricity and may cause the interface circuit to generate heat.

There is a tendency of signal voltage swing to be complicated, since small signal voltage swing is used to increase communication speed or to save electricity. A device corresponding to only one signal voltage swing cannot handle communication with devices of various specifications. In many cases, the input characteristics of signals and the output characteristics of signals do not coincide with each other.

Further, even though the device can communicate with a high-performance device, if the device cannot communicate with existing devices, it cannot be efficiently utilized. For example, it is inconvenient that every time a new device is introduced, all the devices to be connected to the new device must be changed.

SUMMARY OF THE INVENTION

The present invention has been made in consideration of the above problems, and has its object to provide an electronic device which can be appropriately connected to external devices having various specifications.

According to the present invention, the foregoing object is attained by providing an interface apparatus for transmitting and receiving information with an external device via a communication path, comprising: acquisition means for acquiring selection information supplied from the external device via the communication path; and drive means for selecting one of a plurality of drive methods based on the selection information acquired by the acquisition means and driving the communication path.

Preferably, in the interface apparatus, the plurality of drive methods includes a first drive method for driving the communication path in an open-collector drive and a second drive method for driving the communication path in a totem-pole drive.

Preferably, in the interface apparatus, the plurality of drive methods includes a plurality of drive methods for driving the communication path with signal voltage swings different from each other.

Preferably, in the interface apparatus, the communication path is a communication path for bidirectional parallel interface.

Preferably, in the interface apparatus, the selection information is information for selecting a communication mode of communication between the external device.

Further, according to another aspect of the present invention, the foregoing object is attained by providing an interface apparatus for transmitting and receiving information with an external device via a communication path, comprising: acquisition means for acquiring selection information supplied from the external device via the communication path; and input means for setting a threshold value as a reference value for inputting a signal on the communication path, based on the selection information acquired by the acquisition means, and inputting information supplied from the external device via the communication path, with the threshold value as the reference value.

Preferably, the interface apparatus further comprises signal voltage-swing selection means for selecting a signal voltage swing upon driving the communication path based on the selection information acquired by the acquisition means, and the communication path is driven with the signal voltage swing selected by the voltage-swing selection means.

Preferably, in the interface apparatus, the input means includes: a plurality of input devices, having input terminals connected to the communication path, and employing threshold values different from each other; and a selection device for selectively inputting a signal on any of output terminals of the input devices, based on the selection information.

Preferably, in the interface apparatus, the selection information is information for selecting a communication mode of communication between the external device.

Further, according to another aspect of the present invention, the foregoing object is attained by providing an interface apparatus for transmitting and receiving information with an external device via a communication path, comprising: acquisition means for acquiring selection information supplied from the external device via the communication path; drive means for selecting any of a plurality of drive methods based on the selection information acquired by the acquisition means, and driving the communication path; and input means for setting a threshold value as a reference value for inputting a signal on the communication path, based on the selection information acquired by the acquisition means, and inputting information supplied from the external device via the communication path, with the threshold value as the reference value.

Preferably, in the interface apparatus, the plurality of drive methods includes a first drive method for driving the communication path in an open-collector drive and a second drive method for driving the communication path in a totem-pole drive.

Preferably, in the interface apparatus, the plurality of drive methods includes a plurality of drive methods for driving the communication path with signal voltage swings different from each other.

Preferably, in the interface apparatus, the input means includes: a plurality of input devices, having input terminals connected to the communication path, and employing threshold values different from each other; and a selection device for selectively inputting a signal on any of output terminals of the input devices, based on the selection information.

Preferably, in the interface apparatus, wherein the communication path is a communication path for bidirectional parallel interface.

Preferably, in the interface apparatus, the selection information is information for selecting a communication mode of communication between the external device.

Further, according to another aspect of the present invention, the foregoing object is attained by providing an interface apparatus for connecting a plurality of devices via a communication path, comprising: selection-information supply means for supplying selection information from one device to another device via the communication path; and selection means for selecting one of a plurality of drive methods for driving the communication path from the side of the other device, based on the selection information supplied by the selection-information supply means, wherein transmission and reception of information between the devices is performed by driving the communication path in the drive method selected by the selection means.

Preferably, the interface apparatus further comprises setting means for setting a drive method for driving the communication path in correspondence with the selection information, on the side of the one device.

Preferably, in the interface apparatus, the plurality of drive methods, selectable by the selection means, includes a first drive method for driving the communication path in an open-collector drive and a second drive method for driving the communication path in a totem-pole drive.

Preferably, in the interface apparatus, the plurality of drive methods includes a plurality of drive methods for driving the communication path with signal voltage swings different from each other.

Preferably, in the interface apparatus, the communication path is a communication path for bidirectional parallel interface.

Preferably, in the interface apparatus, the selection information is information for selecting a communication mode of communication between the external device.

Further, according to another aspect of the present invention, the foregoing object is attained by providing an interface apparatus for connecting a plurality of devices via a communication path, comprising: selection-information supply means for supplying selection information from one device to another device via the communication path; and selection means for selecting one of a plurality of threshold values as a reference value for inputting a signal on the communication path, based on the selection information supplied by the selection-information supply means, on the side of the other device.

Preferably, the interface apparatus further comprises setting means for setting one of the plurality of threshold values as the reference value for inputting the signal on the communication path in correspondence with the selection information, on the side of the one device.

Preferably, the interface apparatus further comprises means for driving the communication path with a signal voltage swing corresponding to the selection information, from the side of the one device; and means for driving the communication path with a signal voltage swing corresponding to the selection information, from the side of the other device.

Further, according to another aspect of the present invention, the foregoing object is attained by providing an image output apparatus, comprising: an interface apparatus having the above construction; and image formation means for forming an image based on information inputted by the interface apparatus.

Preferably, in the image output apparatus, the image formation means forms the image by an electrophotographic method.

Preferably, in the image output apparatus, the image formation means forms the image in an ink-jet method.

Further, according to another aspect of the present invention, the foregoing object is attained by providing a method of negotiating for transmitting and receiving information with an external device via a communication path, comprising: an acquisition step of acquiring selection information supplied from the external device via the communication path; and a determination step of determining one of a plurality of drive methods as a drive method for driving the communication path, based on the selection information acquired at the acquisition step.

Further, according to another aspect of the present invention, the foregoing object is attained by providing a method of negotiating for transmitting and receiving information with an external device via a communication path, comprising: an acquisition step of acquiring selection information supplied from the external device via the communication path; and a determination step of determining a threshold value as a reference value for inputting a signal on the communication path, based on the selection information acquired at the acquisition step.

Further, according to another aspect of the present invention, the foregoing object is attained by providing a method of negotiating for transmitting and receiving information with an external device via a communication path, comprising: an acquisition step of acquiring selection information supplied from the external device via the communication path; a drive-method determination step of determining one of a plurality of drive methods as a drive method for driving the communication path; and a threshold-value determination step of determining a threshold value as a reference value for inputting a signal on the communication path, based on the selection information acquired at the acquisition step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a table showing communication modes in the output circuit in FIG. 14.

DETAILED DESCRIPTION OF THE PREFERRED EMBODIMENTS

Preferred embodiments of the present invention will now be described in detail in accordance with the accompanying drawings.

First Embodiment

First, an example of the structure of a laser-beam printer and an ink-jet printer as preferred printers to which a first embodiment of the present invention is applied will be described. Note that the present embodiment is applicable to various types of printers in addition to the laser-beam printer and ink-jet printer, and further applicable to electronic devices other than the printers.

Figure 1:
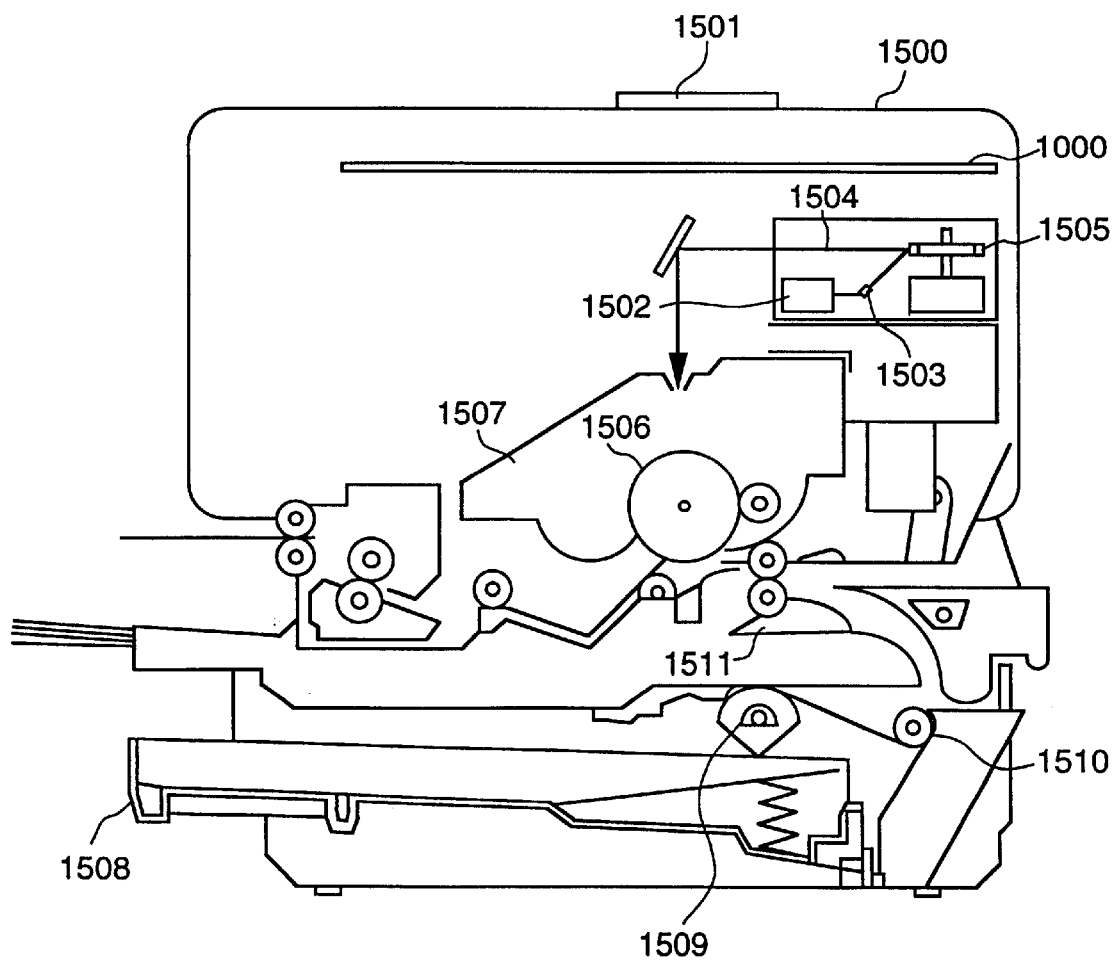
FIG. 1 is a cross-sectional view showing the structure of a laser-beam printer as an electronic device to which a first embodiment of the present invention is applied.

FIG. 1 is a cross-sectional view showing the structure of the laser-beam printer as an electronic device to which the present embodiment is applied. In FIG. 1, reference numeral 1500 denotes a laser-beam printer (LBP) main body which receives print information (character codes, image data etc.) supplied from a host computer (not shown) as a connected external device, form information or macro commands, and stores the received information. The LBP main body 1500 generates character patterns or form patterns based on the stored information, and forms an image on a print sheet as a print medium.

Numeral 1501 denotes an operation panel on which operation switches and LED display devices are provided. Numeral 1000 denotes a printer control unit which controls the overall LBP main body 1500. Also, the printer control unit 1000 interprets the character information and the like supplied from the host computer. The printer control unit 1000 mainly converts the character information into a video signal of a corresponding character pattern or converts the image information into a video signal, and outputs the video signal into a laser driver 1502.

The laser driver 1502, which is used for driving a semiconductor laser 1503, ON/OFF controls the semiconductor laser 1503 which emits a laser beam 1504. The laser beam 1504 is swayed by a rotating polygon mirror 1505, scan-exposing on an electrostatic drum 1506. This forms an electrostatic latent image of a character pattern on the electrostatic drum 1506.

The latent image is developed by a development unit 1507 provided around the electrostatic drum 1506 and transferred onto the print sheet. The print sheet is a cut sheet set in a paper cassette 1508 attached to the LBP main body 1500. The cut sheet is fed into the apparatus by a paper-feed roller 1509 and conveyance rollers 1510 and 1511, and supplied to the electrostatic drum 1506.

Figure 2:
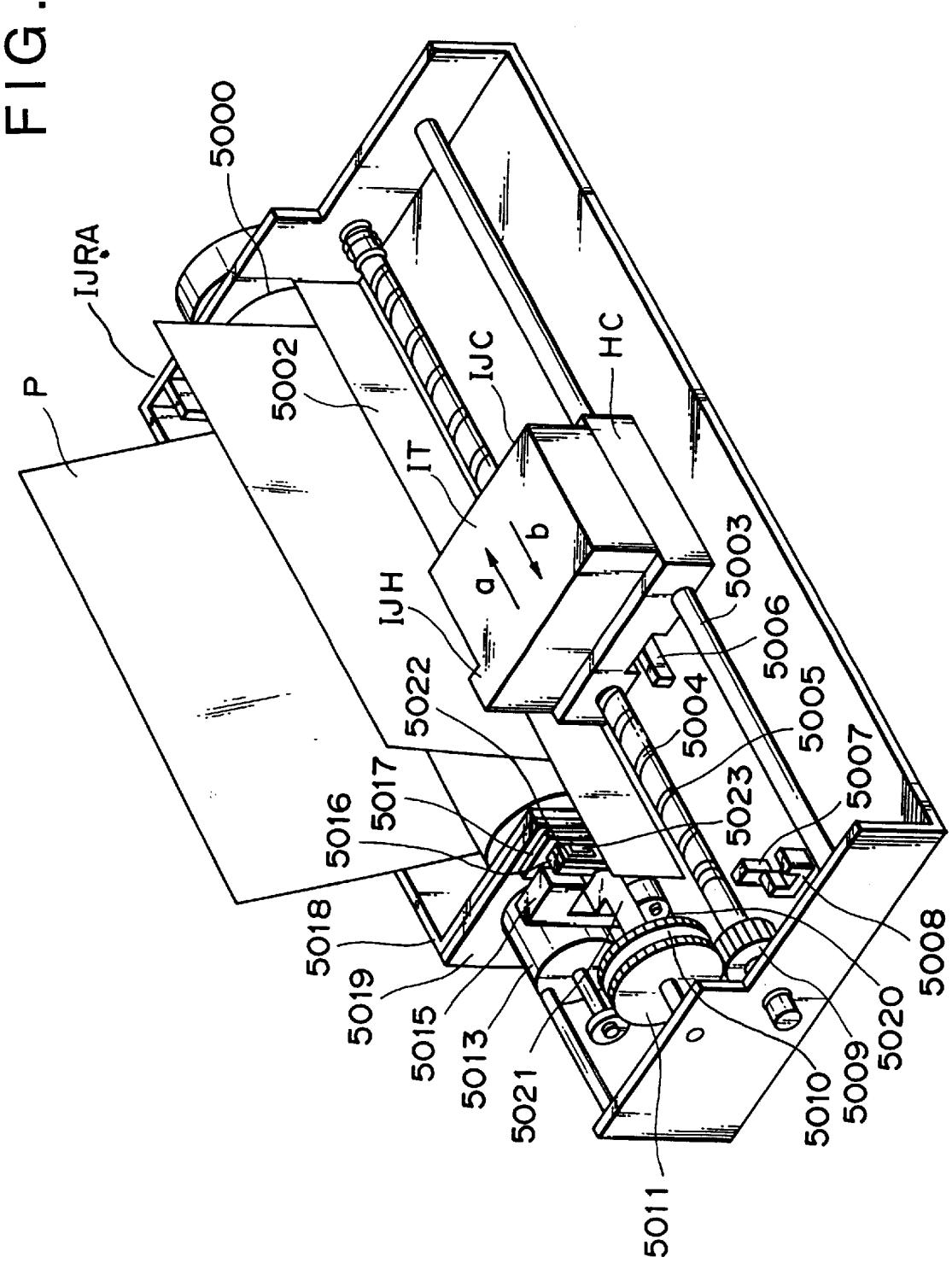
FIG. 2 is a perspective view showing the structure of an ink-jet printer as another electronic device to which the embodiment is applied.

FIG. 2 is a perspective view showing the structure of an ink-jet printing apparatus (IJRA) as another electronic device to which the embodiment is applied.

In FIG. 2, numeral 5005 denotes a lead screw which rotates via drive-force transmission gears 5009 and 5011, interlocking with forward/reverse rotation of a drive motor 5013. A carriage HC engaged with a spiral groove 5004 of the lead screw 5005 has a pin (not shown), and it is reciprocally moved in arrows a and b directions. The carriage HC has an ink-jet cartridge IJC.

Numeral 5002 denotes a paper holding plate which presses the print sheet against a platen 5000 along the moving direction of the carriage HC. Photocouplers 5007 and 5008 are home-position detecting members for confirming the existence of a lever 5006 of the carriage HC in a predetermined area and changing over the rotational direction of motor 5013.

Numeral 5016 denotes a support member which supports a cap member 5022 for capping the front surface of the printhead. Numeral 5015 denotes a suction member which performs suction-restoration of a printhead via a cap inner opening 5023 of the cap member 5022 by sucking the inside of the cap member 5022. Numeral 5019 denotes a member which allows a cleaning blade 5017 to move in a back-and-forth direction. A main-body support plate 5018 supports the cleaning blade 5017 and the member 5019.

Numeral 5012 denotes a lever for starting the suction-restoration. The lever 5021 moves along the movement of a cam 5020 engaged with the carriage HC. A well-known transmission mechanism such as clutch change controls a drive force from the drive motor. When the carriage HC is at the home position area, desired one of these capping, cleaning and suction-restoration is executed at its corresponding position by the lead screw 5005. Any of these processings applicable to the printer, if a desired processing is performed at a well-known timing.

Figure 3:
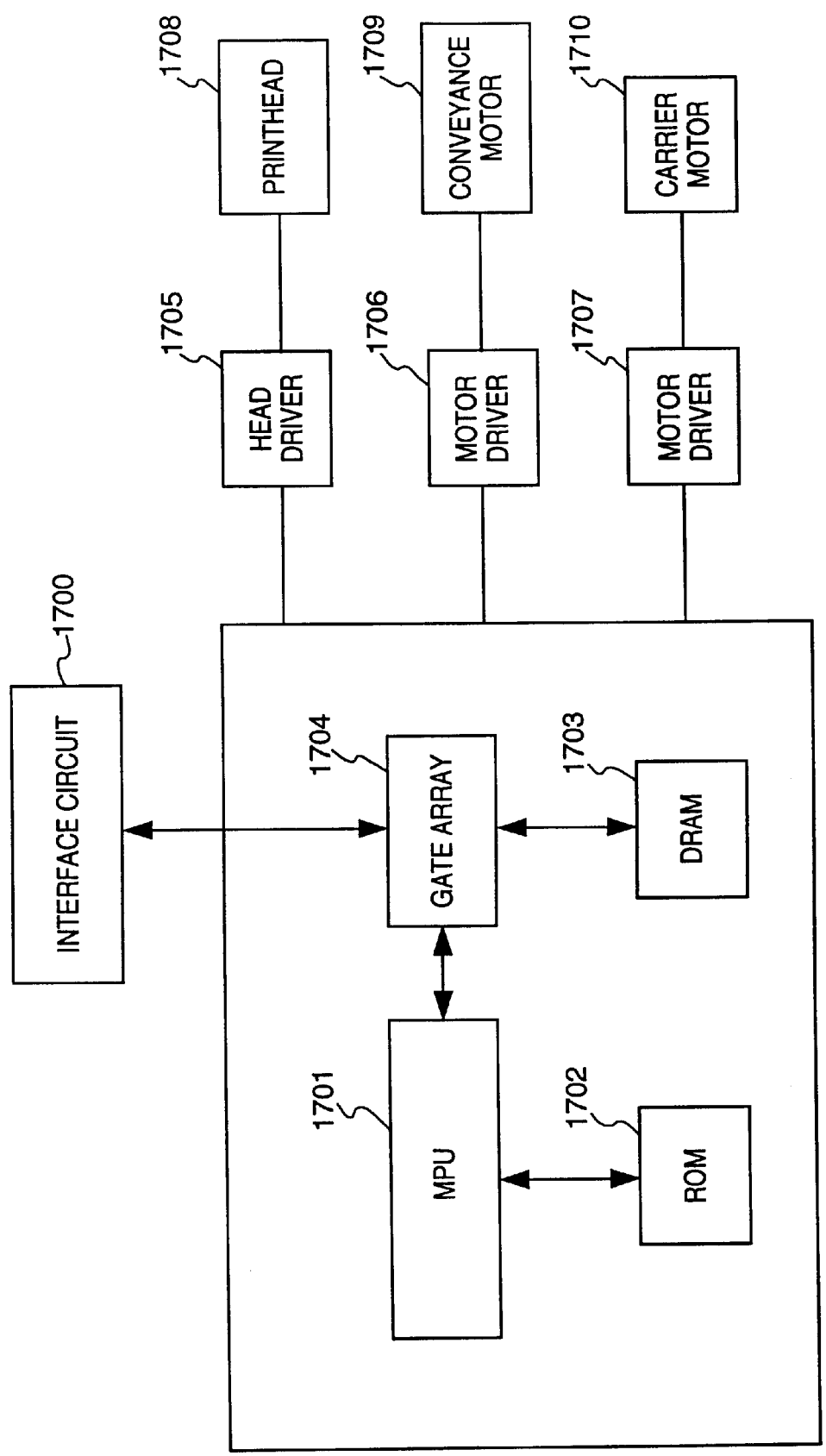
FIG. 3 is a block diagram showing the construction of a controller of the ink-jet printer in FIG. 2.

FIG. 3 is a block diagram showing the construction of a controller of the ink-jet printer in FIG. 2. In FIG. 3, numeral 1700 denotes an interface circuit for transmitting/receiving print information and other various information; 1701, an MPU which reads a control program in a ROM 1702 and controls the ink-jet printer based on the read program; 1702, the ROM for storing control programs, host print information and the like; 1703, a dynamic RAM (DRAM) for storing various data (print information, print data supplied to the printhead, and the like).

Numeral 1704 denotes a gate array which performs supply control of print data to a printhead 1708. The gate array 1704 also performs data-transfer control among the interface circuit 1700, the MPU 1701 and the DRAM 1703. Numeral 1710 denotes a carrier motor for transferring the printhead 1708; 1709, a conveyance motor for conveying the print sheet; 1705, a head driver for driving the printhead 1708; 1706, a motor driver for driving the conveyance motor 1709; and 1707, a motor driver for driving the carrier motor 1710.

When print information is inputted via the interface circuit 1700 from the host computer as a connected external device, the gate array 1704 converts the print information into output information for printing, under the control of the MPU 1701, and supplies the output information to the head driver 1705. The motor drivers 1706 and 1707 are driven, and the head driver 1705 is driven based on the output information, thus print operation is performed.

Figure 4:
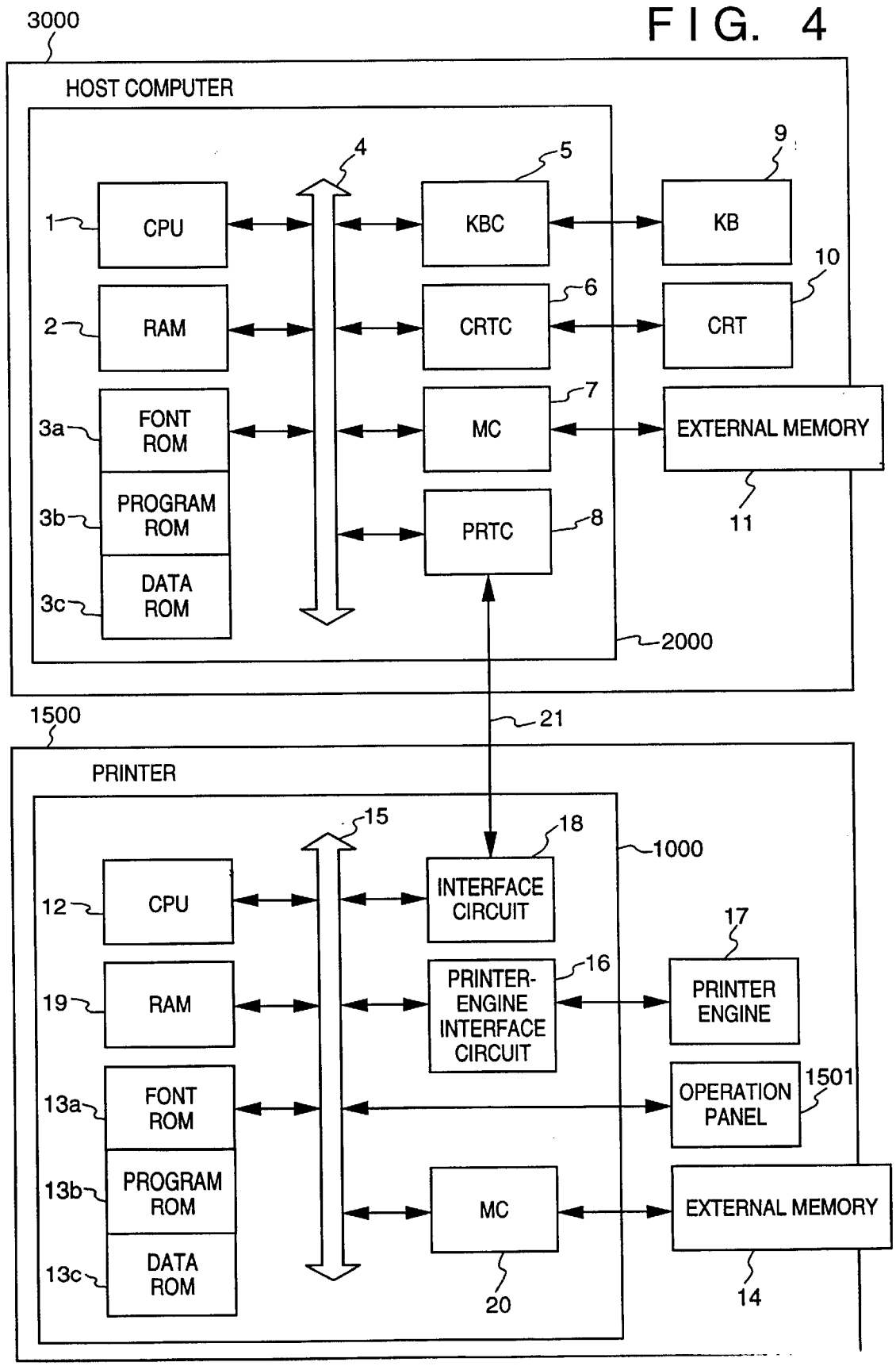
FIG. 4 is a block diagram showing the construction of a printer control system according to the embodiment.

FIG. 4 is a block diagram showing the construction of a printer control system according to the embodiment. Note that FIG. 4 shows the above-described laser-beam printer (1500) connected to the host computer (3000). Hereinbelow, a system connected to a host computer and a laser-beam printer will be described as an example of system where two electronic devices are connected via an interface device.

In the host computer 3000, a CPU 1 performs document processing then generates print information and supplies the print information to the printer 1500, for example, while controlling the respective devices connected to a CPU bus 4, based on an operating system (OS), application programs, a printer driver, control programs and the like, stored in a program ROM 3*b*. Note that the control programs will be described in detail later.

Numeral 3*a* denotes a font ROM in which font data and the like used in document processing are stored; 3*c*, a data ROM in which various data used in the document processing are stored; and 2, a RAM used as a main memory and a work area for the CPU 1.

Numeral 5 denotes a keyboard controller (KBC) which controls key input from a keyboard 9 or a pointing device (not shown); 6, a CRT controller (CRTC) which controls display by a CRT display (CRT) 10; 7, an external-memory controller (MC) which controls an external memory 11 comprising a hard disk (HD) and a floppy disk (FD) and the like for storing a boot program, various application programs, font data, a user file, an editing file and the like.

Numeral 8 denotes a printer controller (PRTC) as an interface circuit for the printer. The printer controller 8 is connected to the printer 1500 via an interface cable 21 for transmitting/receiving information with the printer 1500. The printer controller 8 can drive signal lines included in the interface cable 21 by a plurality of drive methods. For example, the printer controller 8 can drive the control signal lines in the open-collector drive method or the totem-pole drive method. The printer controller 8 can change a drive method in accordance with, e.g., a 5 V signal voltage swing (or power voltage) or a 3.3 V signal voltage swing (or power voltage).

Note that the CPU 1 executes, e.g., development of outline font (rasterize) in a development area provided on the RAM 2, thus enables WYSIWYG on the CRT 10. Further, the CPU 1 opens various registered windows based on a command designated by a mouse cursor (not shown) or the like, and executes various data processing.

In the printer 1500, a CPU 12 controls the various devices connected to a CPU bus 15, based on the control programs and the like stored in a program ROM 13*b* or an external memory 14. The CPU 12 outputs an image signal as output information to a printer engine 17 connected via a printer interface circuit 16. Note that the control programs will be described in detail later.

Numeral 13*a* denotes a font ROM in which font data used upon generation of output information is stored; 13*c*, a data ROM for storing information used on the host computer 3000; and 14, an external memory such as a hard disk, also for storing information used on the host computer 3000.

The CPU 12, which is capable of processing of communication with the host computer 3000 via the interface circuit 18, can notify information in the printer 1500 to the host computer 3000. The interface circuit 18 can drive the interface cable 21 in a plurality of drive methods. For example, the interface circuit 18 drives the interface cable 21 by the open-collector drive method or the totem-pole drive method. The interface circuit 18 can change the drive method in accordance with, e.g., a 5 V signal voltage swing (or power voltage) or a 3.3 V signal voltage swing (or power voltage).

Numeral 19 denotes a RAM used as a main memory or a work memory for the CPU 12. The capacity of the RAM 19 can be expanded by connecting optional RAM(s) to memory-expansion port(s) (not shown). Note that the RAM 19 is used as an output-information development area, an environmental-data storage area, a non-volatile RAM (NVRAM) and the like. The above-described external memory 14 comprising a hard disk (HD), an IC card and the like is controlled by an external memory controller (MC) 20. The external memory 14 is connected as an optional memory, and used for storing font data, emulation programs, form data and the like.

Numeral 1501 denotes the above-described operation panel on which operation switches and LED display devices are provided.

Figure 5:
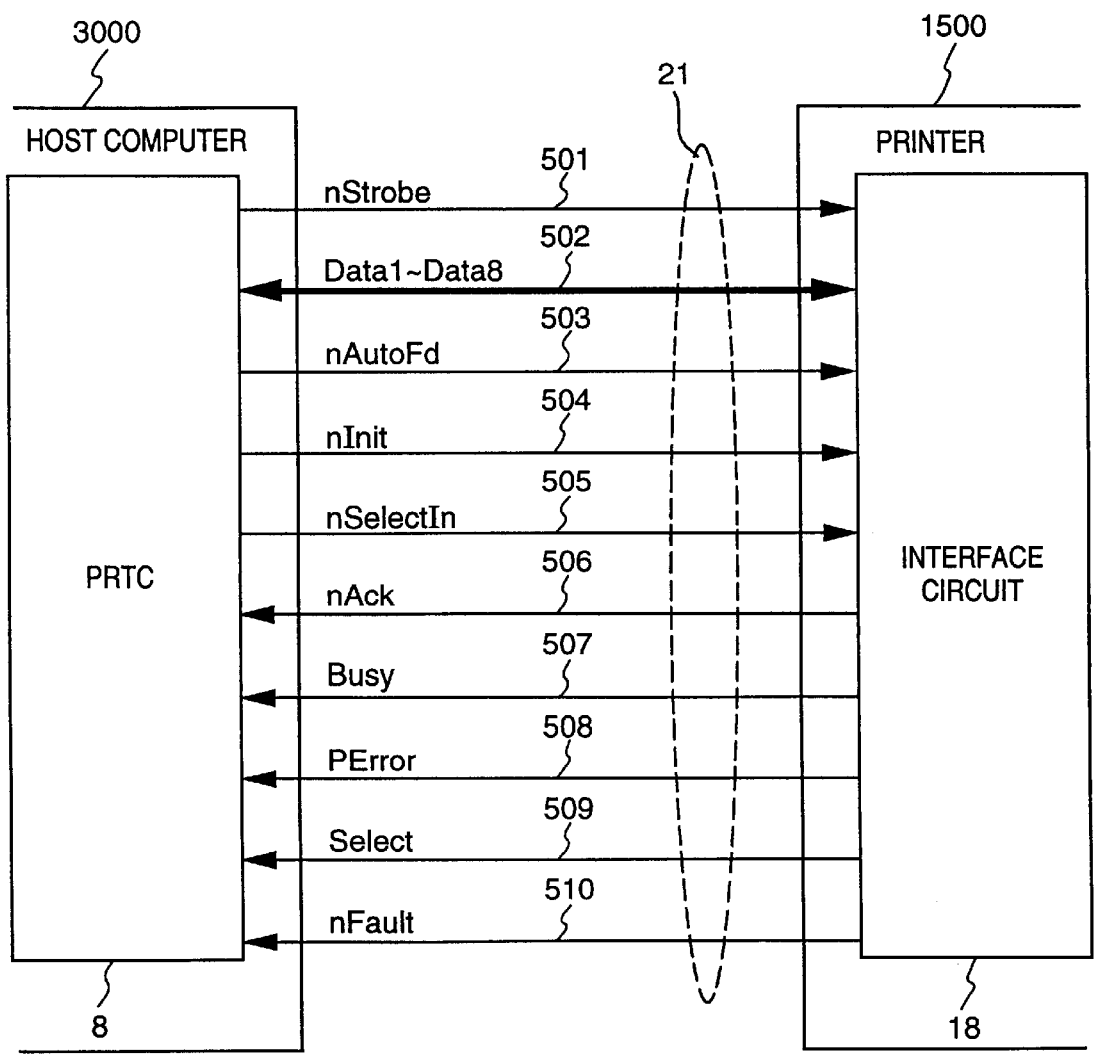
FIG. 5 is an explanatory view showing the structure of interface connecting a host computer and a printer.

FIG. 5 is an explanatory view showing the structure of interface connecting a host computer and a printer. FIG. 5 shows various signals in an 8-bit width parallel interface generally used as a printer interface.

In this example, data is sent via bidirectional signal lines (Data 1 to Data 8) 502. Signal lines 501 and 503 to 505 are control signal lines controlled by the host computer 3000. Signal lines 506 to 510 are control signal lines controlled by the printer 1500.

In this embodiment, the host computer 3000 notifies the printer 1500 of communication-mode change information to instruct to change communication mode (open-collector, totem-pole and the like) by controlling the signal lines 501 and 503 to 510 to set signal values (logic levels) of signals on these signal lines into a specific combination, and setting of the interface circuit 18 of the printer 1500 is made based on the information. For example, if a communication mode where signal lines are driven in the totem-pole drive method is selected, the host computer 3000 may notify the printer 1500 of communication-mode change information designating the drive method. Note that in the following example, the host computer side notifies the printer side of communication-mode change information to control a communication mode of the printer side. However, it may be arranged such that the printer side notifies the host computer side of communication-mode change information to control a communication mode of the host computer side. It is more preferable that communication-mode change can be instructed from both sides.

Figure 6:
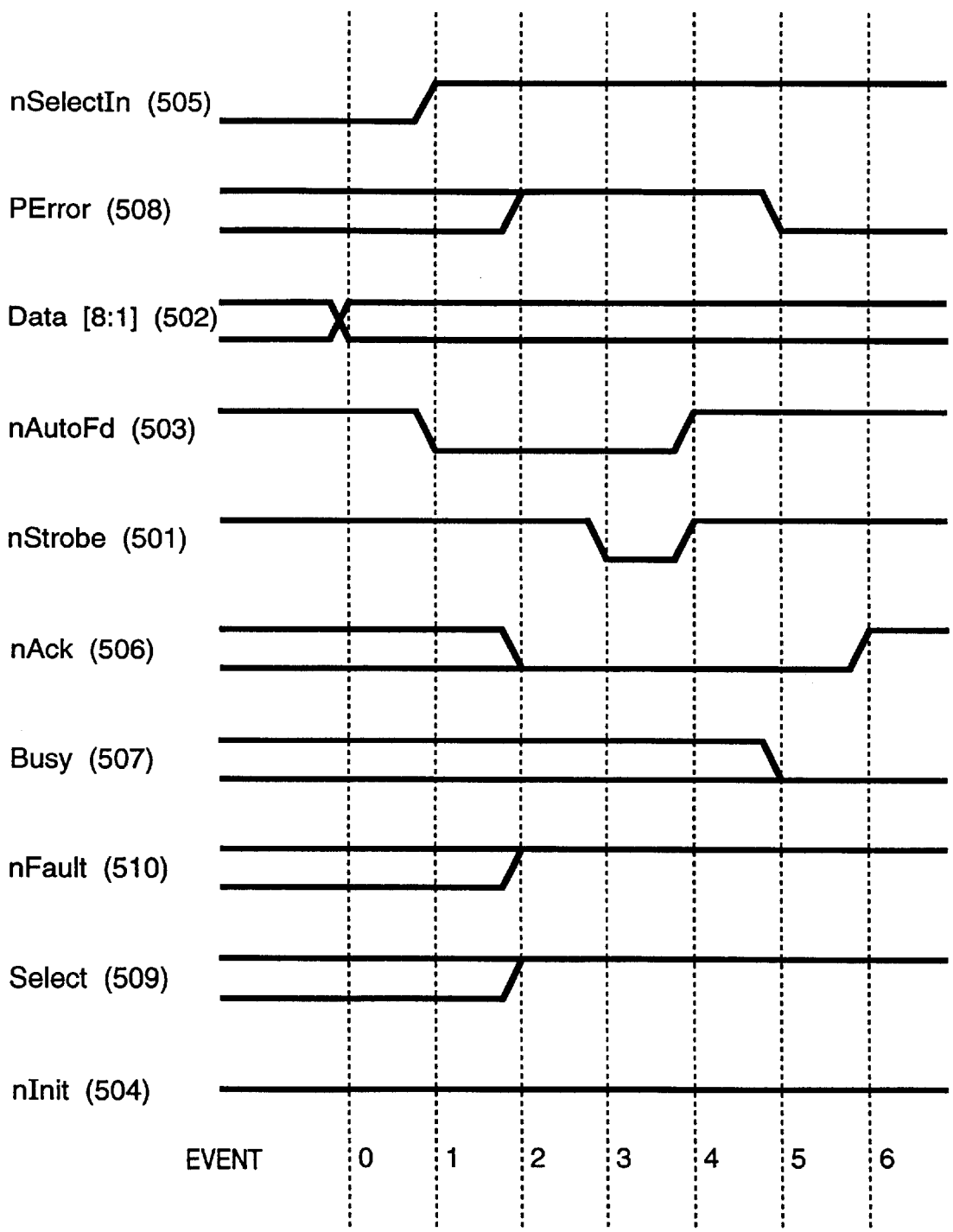
FIG. 6 is a timing chart showing transmission/reception (negotiation) of communication-mode change information.
Figure 7:
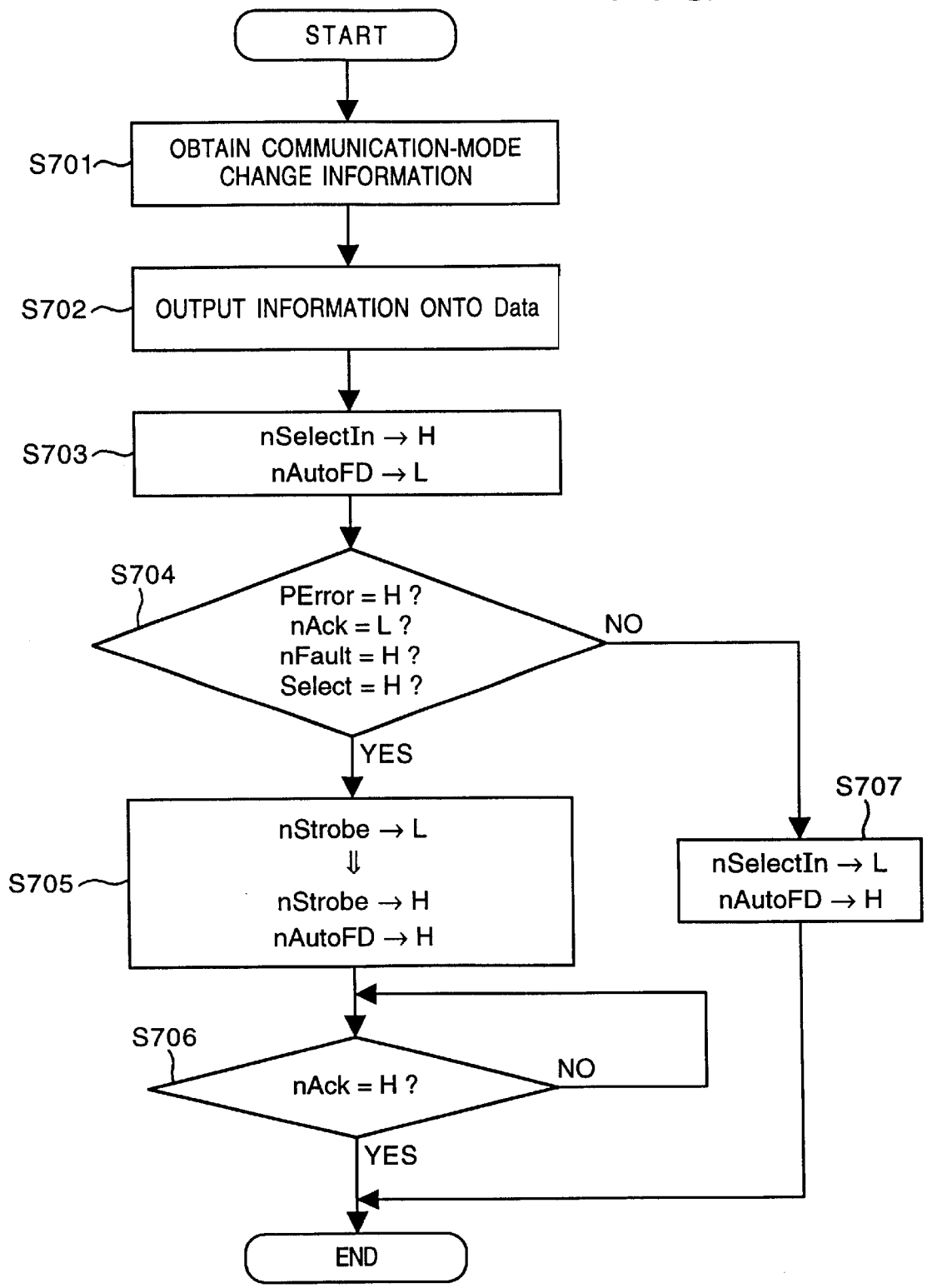
FIG. 7 is a flowchart showing operation of the host computer upon notifying the communication-mode change information.

FIG. 6 is a timing chart showing the transmission/reception (negotiation) of communication-mode change information. FIG. 7 is a flowchart showing operation of the host computer 3000 upon notifying the communication-mode change information. Hereinbelow, operation of the printer controller 8 as an interface circuit of the host computer 3000 side will be described with reference to FIGS. 6 and 7. Note that in this embodiment, the printer controller 8 operates under the control of the CPU 1 based on the control program in the program ROM 3b.

First, at step S701, communication-mode change information is obtained. This information may be defined as "0001(hex)" when the signal lines 501 to 510 are used in the open-collector drive, while "0002(hex)" when the signal lines 501 to 510 are used in the totem-pole drive. Further, the communication-mode change information may be inputted from the keyboard 9 or the like, or may be read from the data ROM 3c or the like. Otherwise, any other method can be used to obtain the communication-mode change information. The control program may be automatically started when the host computer 3000 is turned on, or when it is detected that the printer 1500 has been turned on.

At step S702, the obtained communication-mode change information is outputted onto a signal line Data (502) (Event 0). At step S703, a signal line nSelectIn (505) is turned to H (high) level, while a signal line nAutoFd (503) is turned to L (low) level (Event 1). This causes the printer 1500 to recognize a communication-mode change request.

At step S704, it is determined whether or not the communication-mode change request has been recognized. This determination is made based on whether or not a signal line PError (508) is at the H level, whether or not a signal line nAck (506) is at the L level, whether or not a signal line nFault (510) is at the H level, and whether or not a signal line Select (509) is at the H level (Event 2). Hereinafter, this status where the signal lines are at the above levels will be referred to as a "request-recognized status".

If it is determined that the printer 1500 has become into the request-recognized status within a predetermined period, the process proceeds to step S705, at which a signal line Strobe (501) is set to the L level (Event 3) so that the printer 1500 can input the communication-mode change information, and the signal line Strobe (501) and a signal line nAutoFd (503) are set to the H level (Event 4).

On the other hand, if it is determined at step S704 that the printer 1500 has not become into the request-recognized status within the predetermined period, a signal line nSelectIn (505) is set to the L level and the signal line nAutoFd (503) is set to the H level at step S707.

At step S706, to recognize the completion of communication-mode change (Event 5) and the completion of processing related to the communication-mode change, it is waited until the level of the signal line nAck (506) becomes the H level (Event 6). Hereinafter, communication in the set communication mode is possible.

Note that on the host computer 3000 side, a communication mode of the printer controller 8 is set to a mode corresponding to the above communication-mode change information. This setting is made before the completion of processing as shown in FIG. 7, i.e., before starting of communication in the set communication mode.

Figure 8:
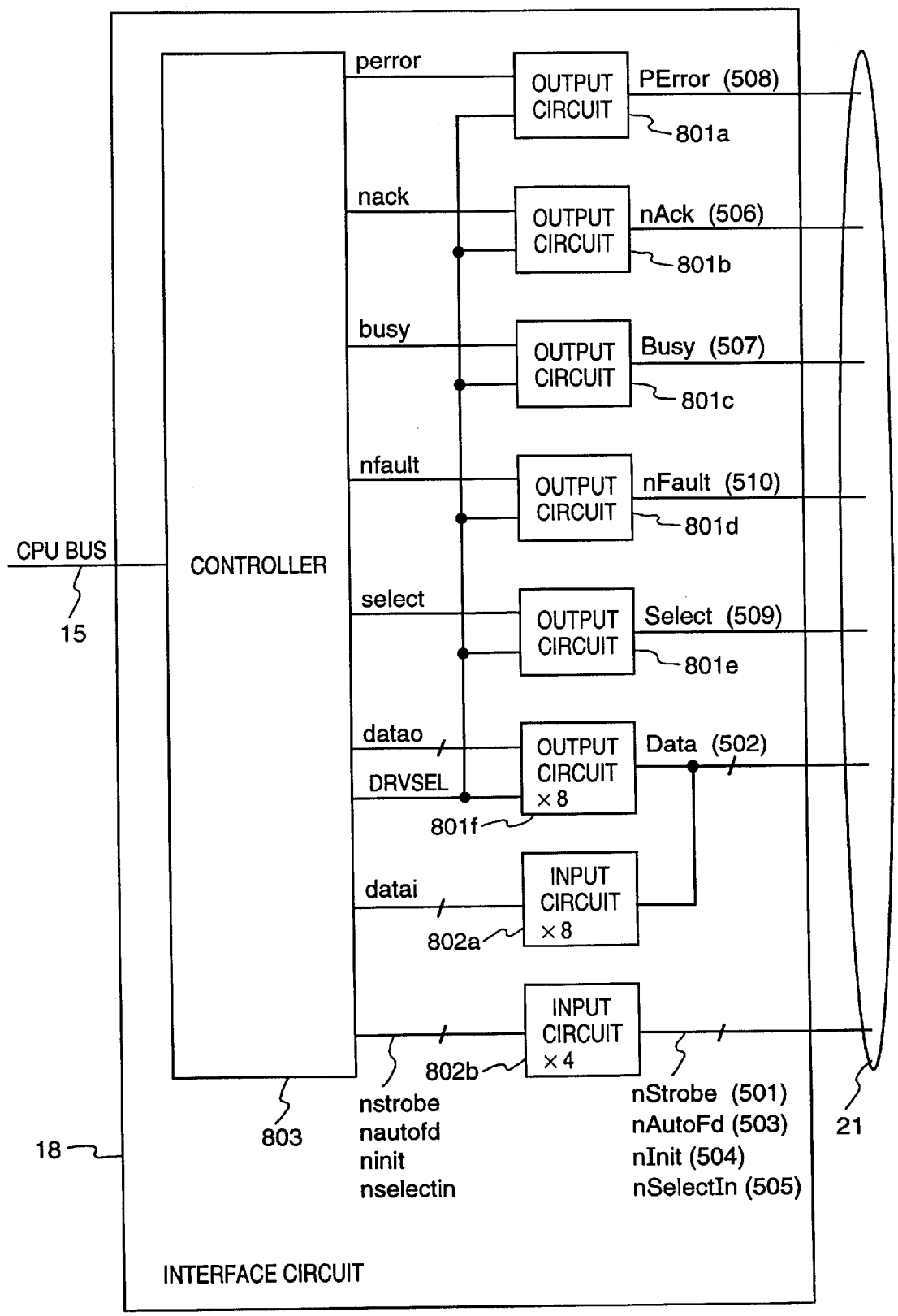
FIG. 8 is a block diagram showing the construction of an interface circuit on the printer side.

FIG. 8 is a block diagram showing the construction of the interface circuit 18 of the printer 1500. A controller 803 generates signals perror, nack, busy, select, datao as internal signals corresponding to signals to be outputted onto the signal lines PError (508), nAck (506), Busy (507), nFault (510), Select (509) and Data (502). Further, the controller 803 inputs a signal datai corresponding to a signal inputted via the signal line Data (502), and signals nstrobe, nautofd, ninit, nselectin corresponding to the signal lines nStrobe (501), nAutoFd (503), nInit (504) and nSelectIn (505). The controller 803 it performs communication-mode change under the control of the CPU 12, as well as other general host-computer functions.

Output circuits 801a to 801f respectively output signals corresponding to logical levels of the signals perror, nack, busy, select and datao onto the signal lines PError (508), nAck (506), Busy (507), nFault (510), Select (509) and Data (502). Note that the output circuit 801a to 801e have the same construction. The output circuit 801f comprises eight output circuit 801 (each corresponding to a bit of Data (502)). In the interface cable 21, a drive method (e.g., open-collector or totem-pole) of the signal lines is set by a control signal DRVSEL.

Input circuits 802a and 802b input signals through the signal lines Data (502), nStrobe (501), nAutoFd (503), nInit (504) and nSelectIn (505). The input circuit 802a comprises eight input circuit 802; and the input circuit 802b, four input circuit 802.

Figure 9:
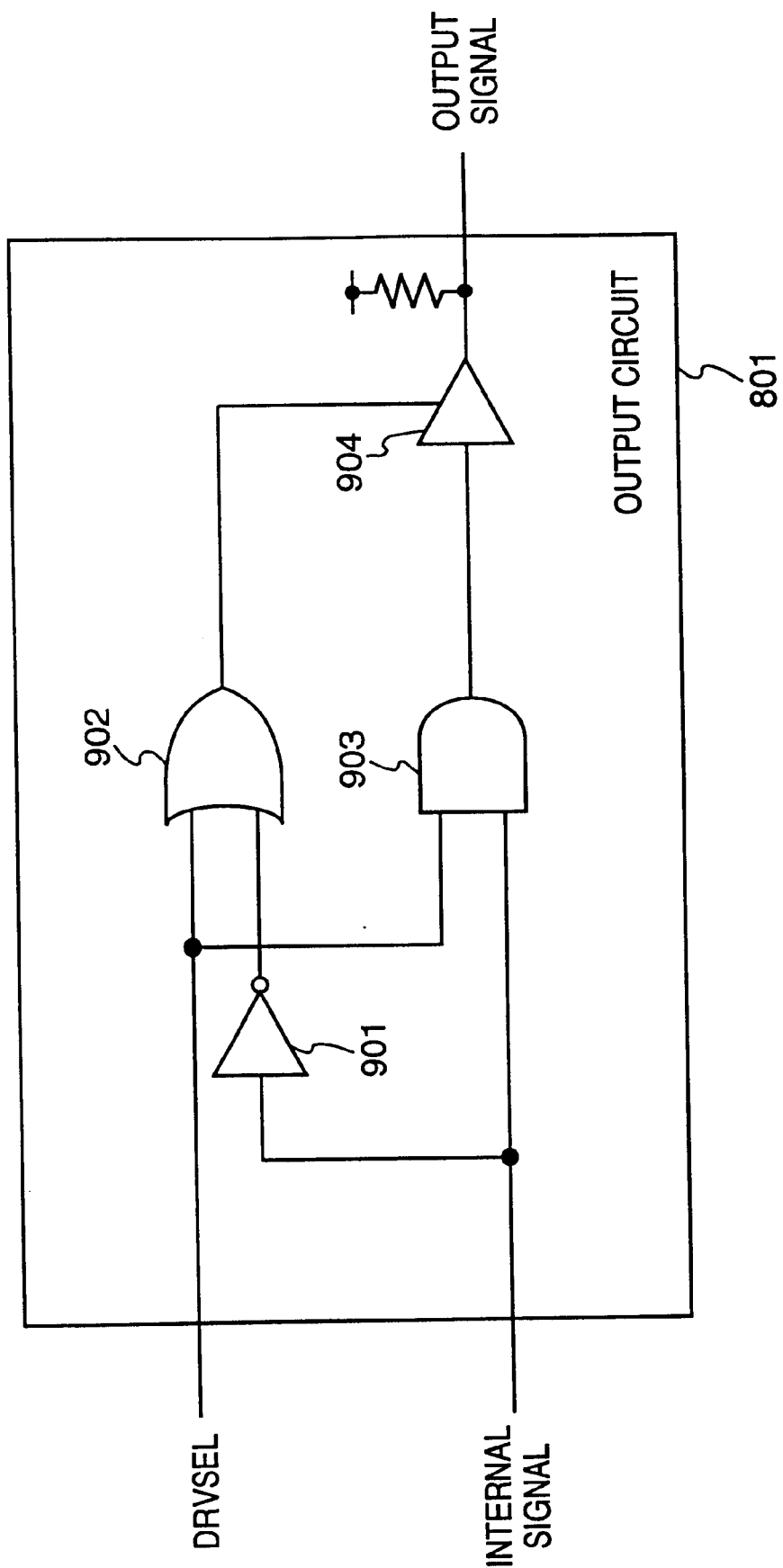
FIG. 9 is a logic diagram showing the construction of an output circuit.

FIG. 9 is a logic diagram showing an example of construction of the output circuit 801. The output circuit 801 inputs the control signal DRVSEL and internal signals such as perror. The output circuit 801 generates an output signal to drive the signal lines of the interface cable 21 such as PError.

In FIG. 9, numeral 901 denotes an inverter; 902, an OR gate; 903, an AND gate; and 904, a 3-state buffer. Note that as manufacturing process of these gates, a bipoler process or a CMOS process may be employed. However, any other processes may be used for manufacturing the gates. In this embodiment, as a driving method, open-collector or totem-pole drive is used for the convenience of description. However, this does not limits the present invention to the bipolar process, but any construction substantially similar to the present construction (e.g., open drain or CMOS output) in the CMOS process may be included.

First, the operation when the control signal DRVSEL is at the L level will be described. In this case, the output from the AND gate 903 is fixed to the L level. The logic levels of the internal signals (e.g., perror) are inverted by the inverter 901, and inputted via the OR gate 902 to an enable terminal of the 3-state buffer 904. That is, when the internal signals are at the L level, the output from the 3-state buffer 904 is at the L level; on the other hand, when the internal signals are at the H level, the output from the 3-state buffer 904 is at the high-impedance status which equals open-collector output.

Next, the operation when the control signal DRVSEL is at the H level will be described. In this case, the output from the OR gate 902 is fixed to the H level, and the output from the 3-state buffer 904 is in enable status. That is, the output from the 3-state buffer 904 is at the same level of the logic levels of the internal signals, which equals totem-pole output.

Figure 10:
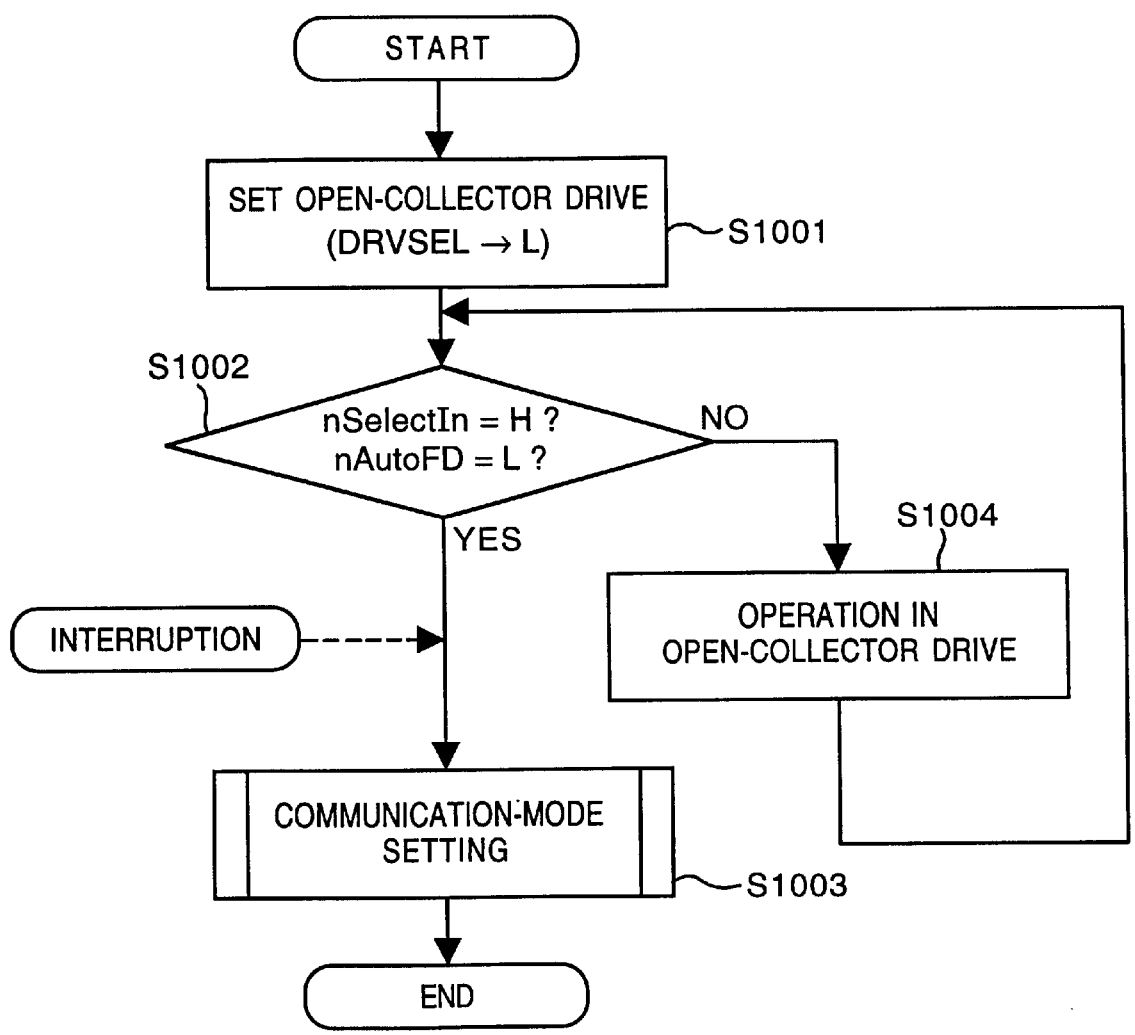
FIG. 10 is a flowchart showing processing on the printer side upon receiving the communication-mode change information from the host computer and change the communication mode.

FIG. 10 is a flowchart showing the processing of obtaining communication-mode change information from the host computer and change a communication mode. Note that in the present embodiment, the interface circuit 18 operates under the control of the CPU 12 based on the control program in the program ROM 13b. This processing is started immediately after the printer 1500 has been turned on.

At step S1001, the printer 1500 initializes a communication mode to the open-collector drive by setting the control signal DRVSEL to the L level. Note that the initialization may be performed by means of hardware immediately after the printer has been reset.

At step S1002, it is determined whether or not the signal line nSelectIn (505) is at the H level and the signal line nAutoFd (503) is at the L level, i.e., the host computer 3000 is requiring communication-mode change. If NO, the process proceeds to step S1004, at which communication is performed in the communication mode set through the initialization at step S1004. Then, after a predetermined period has elapsed, for example, the process returns to step S1002, at which the above determination is performed. If it is determined at step S1002 that the communication-mode change request has been recognized (request-recognized status in Event 1), the process proceeds to step S1003 at which communication-mode setting processing is performed. After the completion of the communication-mode setting processing, communication is performed in the set communication mode.

According to the above flowchart, it is not assumed that the communication-mode changing request is received after setting communication mode has been set, however, the present embodiment is applicable to a case where re-setting of communication mode is possible. In this case, the communication mode can be reset by periodically performing step S1002 or generating interruption ("interruption" in FIG. 10) when it is detected that the condition of determination at step S1002 is satisfied. In a case where the power of the host computer 3000 is turned off, if communication-mode change information instructing to set the communication mode to the open-collector drive is received, for example, the communication mode can be changed based on the received information. This prevents overcurrent as described above.

Figure 11:
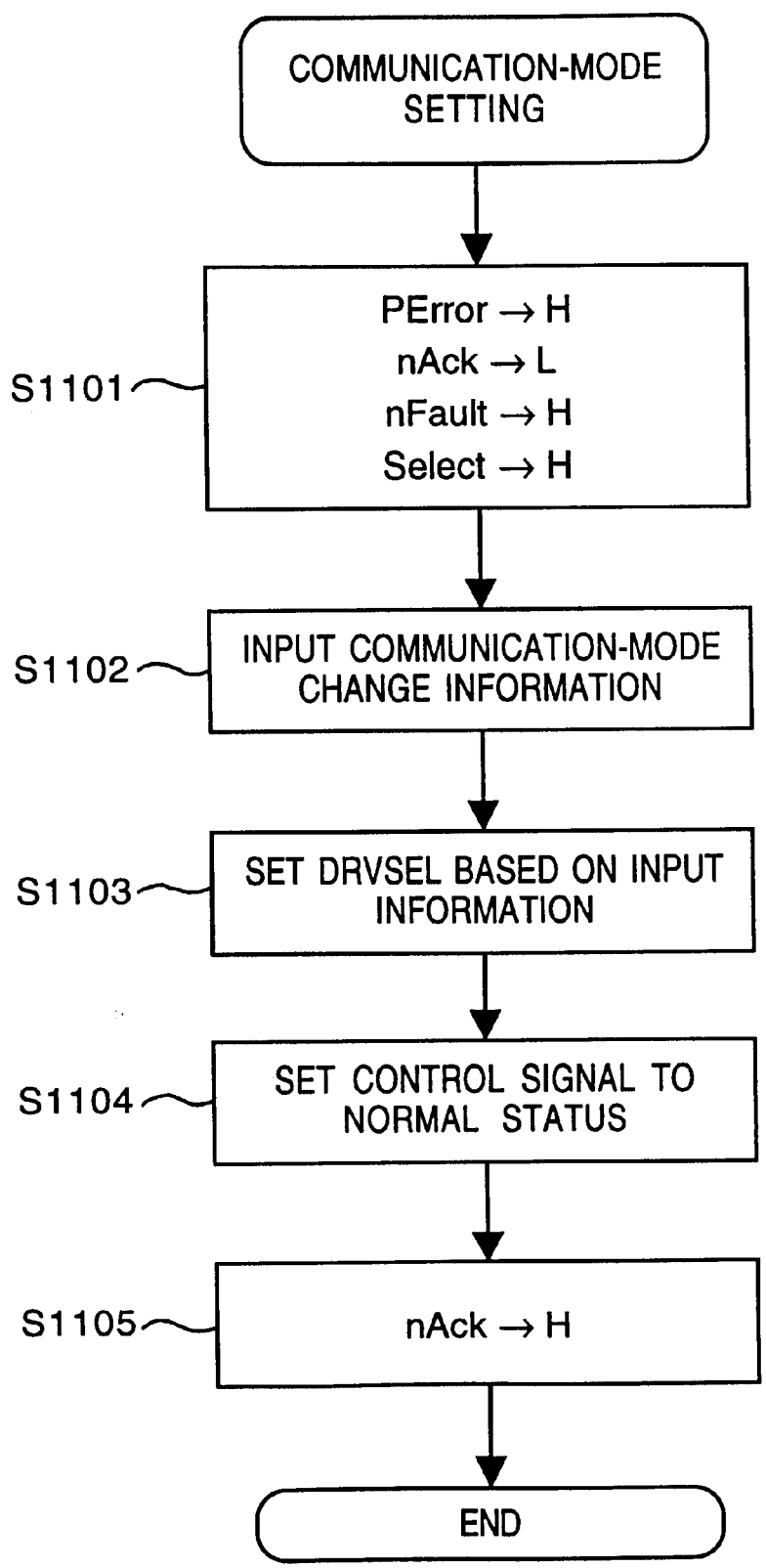
FIG. 11 is a flowchart showing communication-mode setting processing.

FIG. 11 is a flowchart showing communication-mode setting processing. At step S1101, to notify the host computer 3000 that the communication-mode changing request has been recognized, the signal line PError (508) is set to the H level; the signal line nAck (506), to the L level; the signal line nFault (510), to the H level; and the signal line Select (509), to the H level (Event 2).

At step S1102, communication-mode change information on the signal line Data (502) is inputted based on instruction to input the communication-mode change information (Events 3 and 4). At step S1103, the control signal DRVSEL is set based on the input communication-mode change information. For example, if the communication-mode change information instructs to set the communication mode to the totem-pole drive, the control signal DRVSEL is set to the H level. In a case where the power of the host computer 3000 is turned off, if communication-mode change information instructs to set the communication mode to the open-collector drive, the control signal DRVSEL is set to the L level. Note that in this embodiment, two drive methods are considered as communication modes, however, the embodiment is applicable to a case using three or more drive methods.

At step S1104, the signal lines PError (508), Busy (507) and Select (509) are set to normal status (Event 5). At step S1105, to notify the host computer 3000 that the communication-mode change has been completed, the signal line nAck (506) is set to the H level (Event 6).

Note that in this embodiment, communication mode is changed in accordance with communication-mode change information supplied from the host computer 3000, however, the present embodiment is not limited to this arrangement. For example, the embodiment is applicable to a case where the communication mode is changed based on an instruction from the operation panel 1501.

Figure 16:
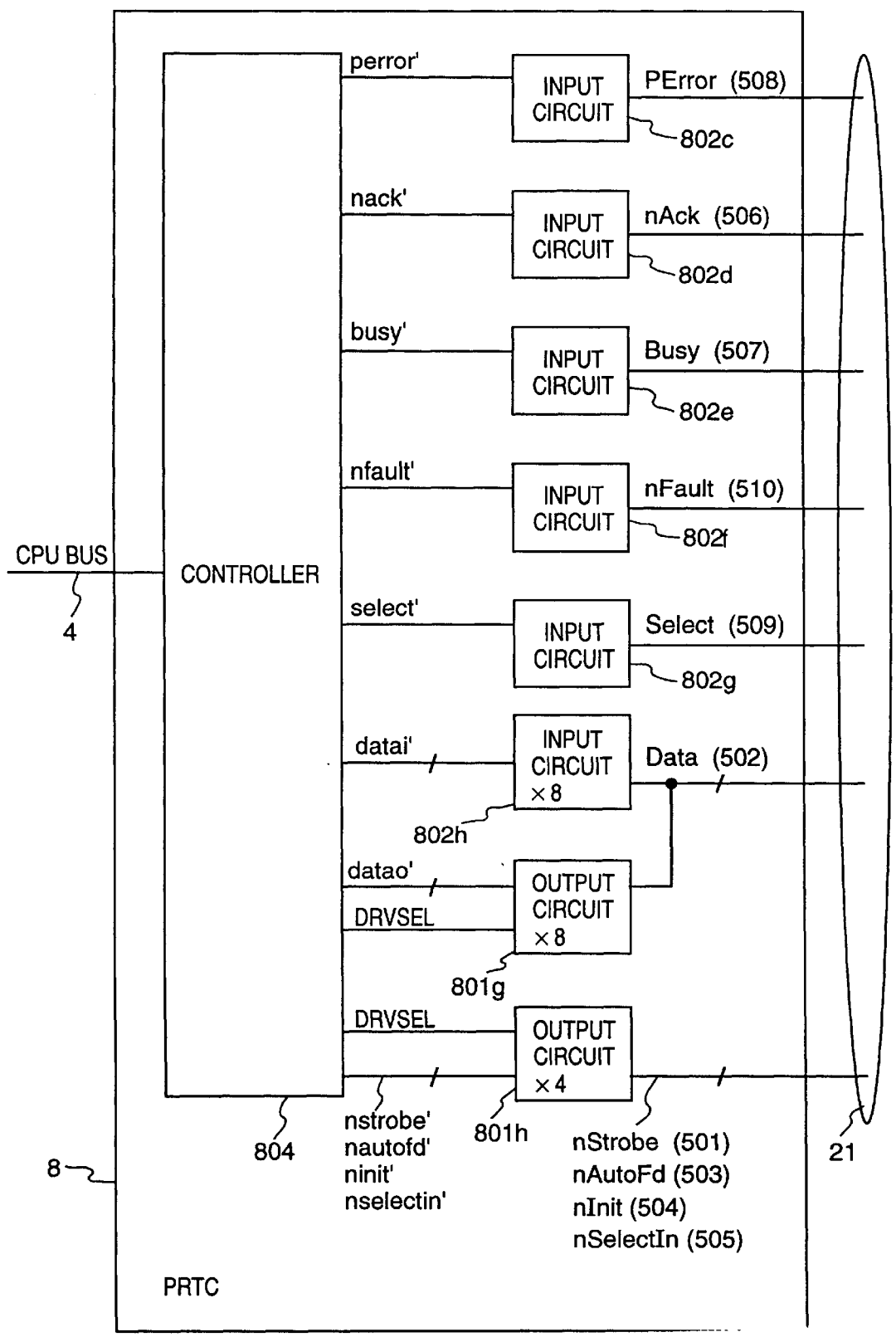
FIG. 16 is a block diagram showing the construction of an interface circuit on the host computer side.

FIG. 16 is a block diagram showing the construction of the printer controller 8 of the host computer 3000. A controller 804 inputs signals on the signal lines PError (508), nAck (506), busy (507), nFault (510), Select (509) and Data (502) as signals perror', nack', busy', select' and datai'. The controller 804 generates signals datao to be outputted onto the signal line Data (502) and internal signals nstrobe', nautofd', ninit' and nselectin' corresponding to signals to be outputted onto the signal lines nStrobe (501), nAutoFd (503), nInit (504) and nSelectIn (505). Further, the controller 804 performs communication-mode change under the control of the CPU 1, as well as other general printer functions.

After the processing as shown in FIG. 10 has been completed, the communication-mode change is performed before communication is started in the new communication mode. Further, similar to the case of the interface circuit 18, the communication-mode change can be performed by controlling the logic level of the control signal DRVSEL to be corresponding to communication mode (communication-mode change information).

Figure 13:
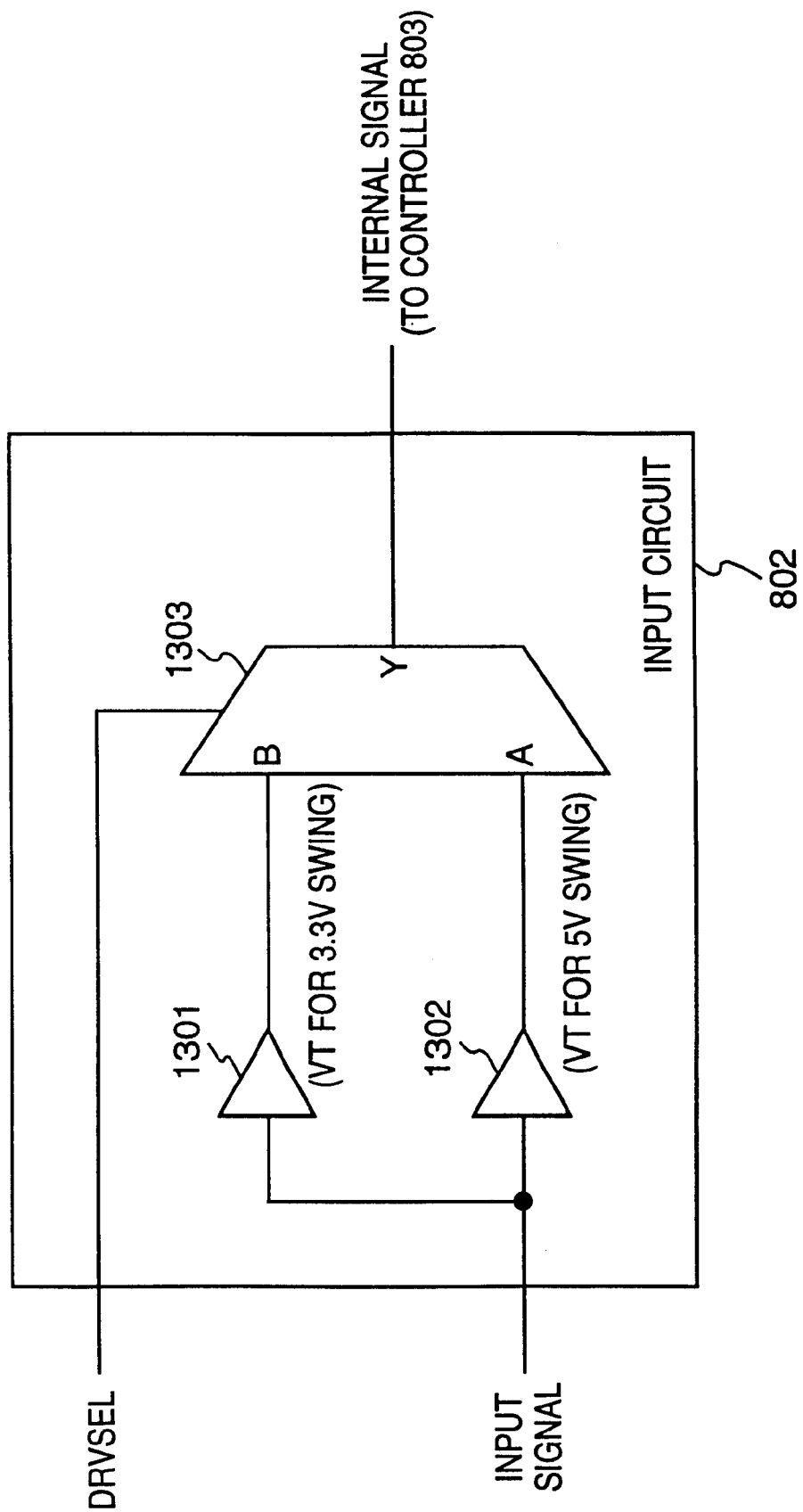
FIG. 13 is a logic diagram showing the construction of an input circuit corresponding to the two types of signal voltage swings, according to the second embodiment.

Note that the input circuits 802c to 802h have the same construction as that of the input circuit 802 (see FIG. 13). The output circuit 801g comprises eight output circuit 801; the output circuit 801h, four output circuit 801.

The operation of the output circuit 801 and that of the input circuit 802 are as described above.

According to the present embodiment, the drive method of the interface circuit can be appropriately changed in accordance with the specification of a host computer of communication-destination party, which effectively utilizes the performance of a host computer (external device) to be connected.

For example, if the host computer has only an open-collector type interface circuit, an interface circuit of the printer can be set to the open-collector drive.

Further, if the host computer has a totem-pole type interface circuit, the interface circuit of the printer can be set to the totem-pole drive, which increases communication speed.

In a case where the power of one device which has an open-collector type interface circuit is turned off, overcurrent which may be by caused by the totem-pole drive of another device can be prevented by changing the drive method of both interface circuits to the open-collector drive.

Second Embodiment

Next, a second embodiment will be described. In this embodiment, the signal voltage swing of an interface circuit of one device is changed, in accordance with a signal voltage swing of an interface circuit of the other device connected to the former device.

In this example, an interface circuit communicable with an interface circuit having a 5 V signal voltage swing and an interface circuit having a 3.3 V signal voltage swing will be described.

Figure 12:
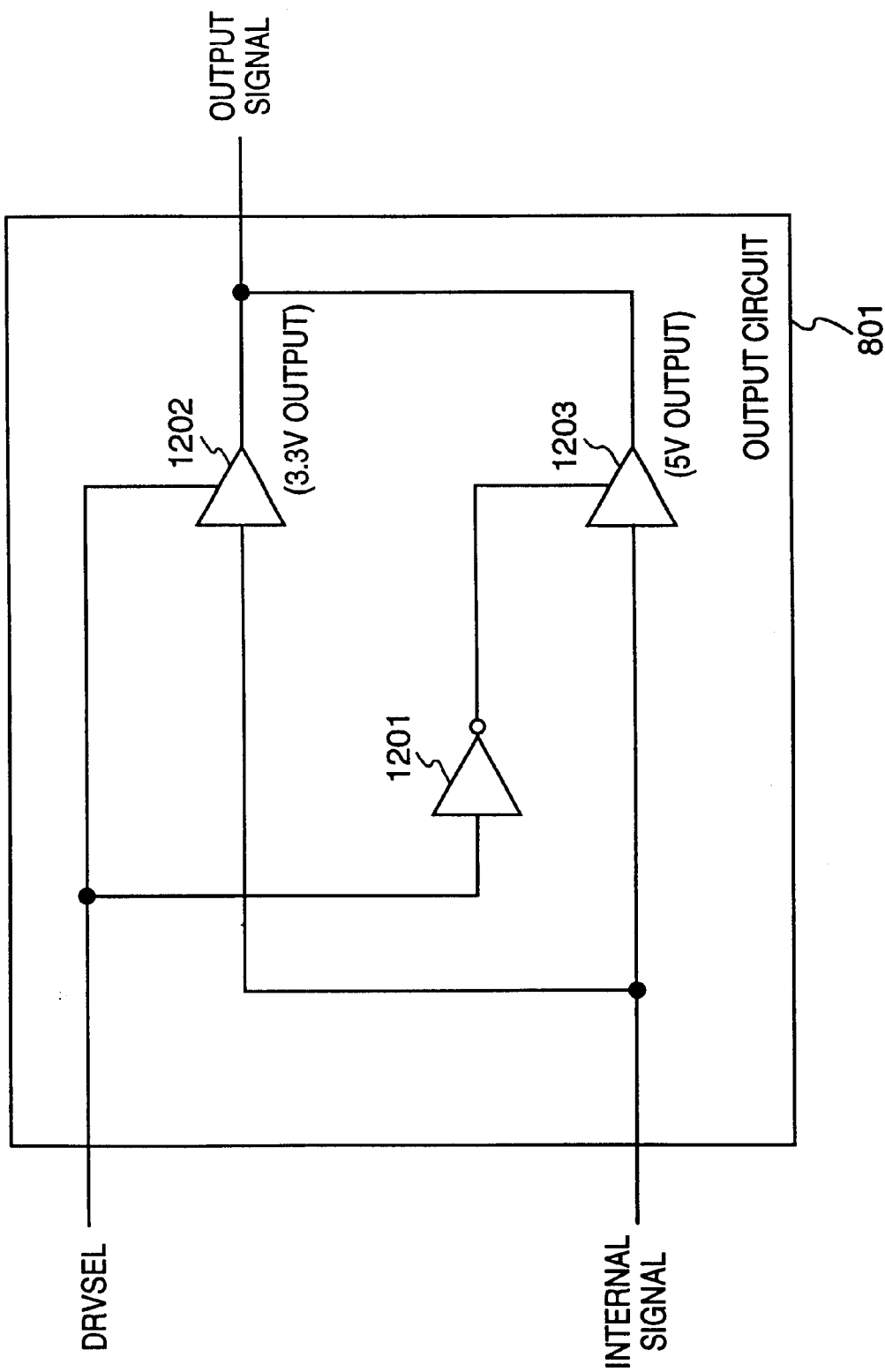
FIG. 12 is a logic diagram showing the construction of the output circuit corresponding to two types of signal voltage swings, according to a second embodiment.

FIG. 12 is a logic diagram showing the construction of an output circuit corresponding to two types of signal voltage swings, according to the second embodiment. Note that the control signal DRVSEL, the internal signal, and the output signal substantially correspond to the signals in FIG. 9. However, in this embodiment, the control signal DRVSEL functions as a signal to change the signal voltage swing of the output signal.

In FIG. 12, numeral 1201 denotes an inverter; 1202, a 3-state buffer having a 3.3 V signal voltage swing; and 1203, a 3-state buffer having a 5 V signal voltage swing.

When the control signal DRVSEL is at the L level, the 3-state buffer 1203 is enabled. The output from the 3-state buffer 1202 becomes into high-impedance status, then a 5 V signal voltage swing signal is outputted. On the other hand, when the control signal DRVSEL is at the H level, the 3-state buffer 1202 is enabled. The output from the 3-state buffer 1203 becomes into high-impedance status, then a 3.3 V signal voltage swing signal is outputted.

Note that the control signal DRVSEL is controlled in substantially the same manner as that in the first embodiment.

FIG. 13 is a logic diagram showing the construction of the input circuit corresponding to two types of signal voltage swings. In FIG. 13, the input circuit 802 inputs a signal on the signal line (e.g., nStrobe (501)) of the interface cable 21, and supplies the signal to the controller 803.

In FIG. 13, numeral 1301 denotes an inverter having a threshold value corresponding to the 3.3 V signal voltage swing; 1302, an inverter having a threshold value corresponding to the 5 V signal voltage swing; and 1303, a selector which selects the output from the inverter 1302 when the control signal DRVSEL is at the L level, while selects the output from the inverter 1301 when the control signal DRVSEL is at the H level.

In this construction, when the input signal (e.g., a signal on the signal line nStrobe) has the 5 V signal voltage swing, the control signal DRVSEL is set to the L level, so that the input signal is transferred to the controller 803 with a threshold of about 2.5 V. On the other hand, when the input signal has the 3.3 V signal voltage swing, the control signal DRVSEL is set to the H level, so that the input signal is transferred to the controller 803 with a threshold value of about 1.6 V. Accordingly, the change of input signal can be recognized with an appropriate threshold value corresponding to a signal voltage swing, and the signal value can be inputted. This increases communication speed.

Note that it is preferable to comprise both of the output circuit in FIG. 12 and the input circuit in FIG. 13, however, it is possible to use only one of these circuits.

Third Embodiment

Next, a third embodiment will be described as a combination of the first and second embodiment, where the open-collector drive or the totem-pole drive can be selected as a drive method of signal lines of the interface circuit. Also, the 5 V signal voltage swing and the 3.3 V signal voltage swing can be selected.

Figure 14:
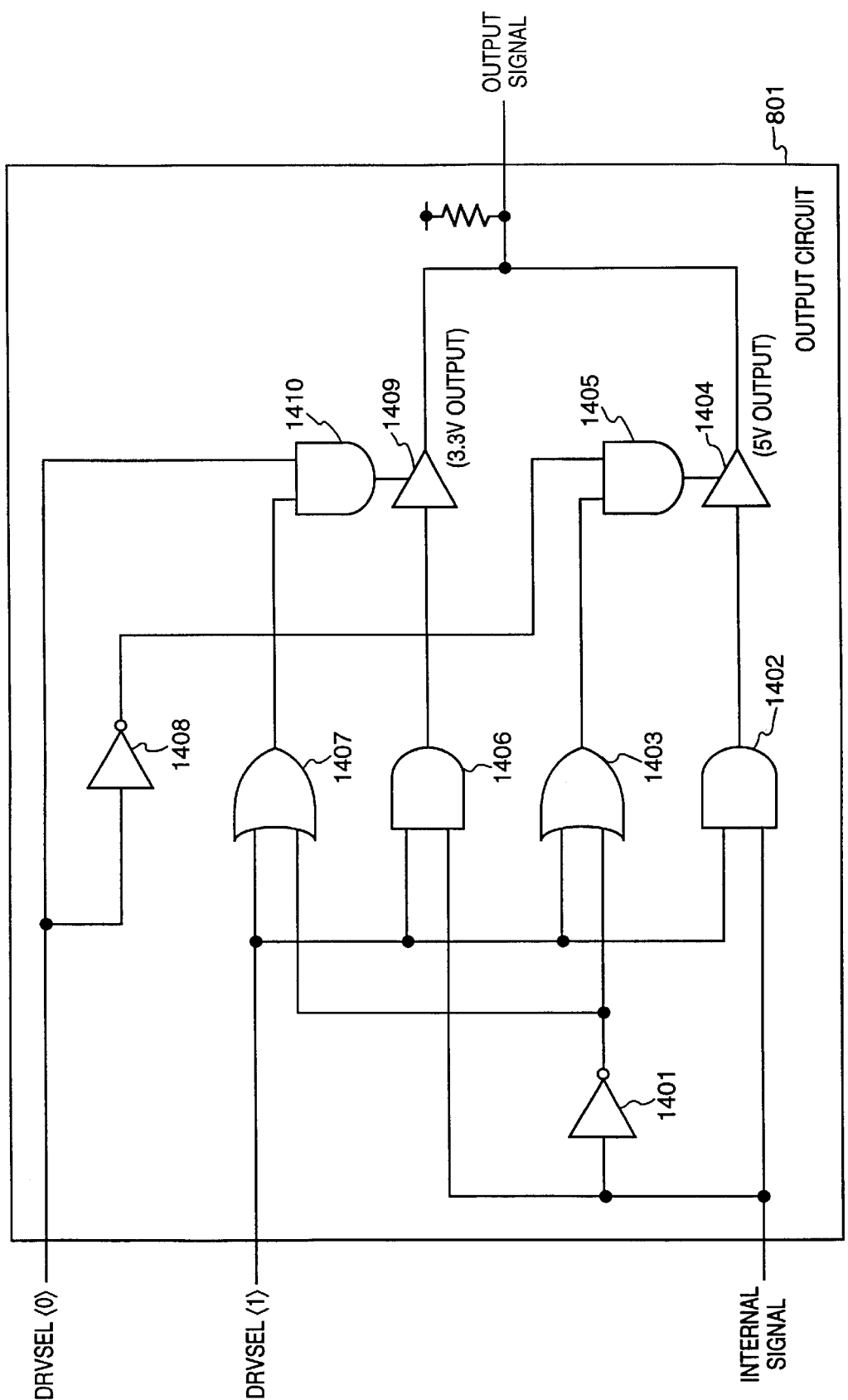
FIG. 14 is a logic diagram showing the construction of the output circuit 801 according to a third embodiment.

FIG. 14 is a logic diagram showing the construction of the output circuit 801 according to the third embodiment. In FIG. 14, numeral 1401 and 1408 denote inverters; 1402, 1405 to 1406 and 1410, AND gates; 1403 and 1407, OR gates; 1404, a 3-state buffer having a 5 V signal voltage swing; and 1409, a 3-state buffer having a 3.3 V signal voltage swing.

The control signal DRVSEL <1:0> is controlled by the controller 803 as the control signal DRVSEL of the above embodiments. The internal and output signals are used as follows.

FIG. 15 is a table showing communication modes in the output circuit in FIG. 14. As shown in FIG. 15, four communication modes can be selected as signal-line drive methods. For example, when the value of the DRVSEL <1:0> is "00", a communication mode where the output circuit 801 in FIG. 14 operates in the open-collector drive method with a 5 V signal voltage swing is selected.

In the present embodiment, the communication mode of the printer side is changed, however, the present invention is also applicable to a case where the communication mode of the host computer side is changed.

Further, the present invention is applicable to, as well as a printer or a host computer, communication devices or various electronic devices including the communication devices.

In the above embodiments, the open-collector and totem-pole drive methods using the 5 V and 3.3 V signal voltage swings are described as selectable communication modes, however, the present invention is not limited to these communication modes, but applicable to any method regarding connection between interface circuits.

Further, in the above embodiments, the interface circuits are controlled by means of software, however, the control can be made by means of hardware such as logic circuits.

APPLICATION EXAMPLE

Next, an example where the first to third embodiments are applied to communication based on a communication protocol defined in the IEEE standard 1284-1994 will be described. In this communication protocol, a compatibility mode, a Nibble mode, an ECP mode and the like are available. These communication modes are described in "Standard Signaling Method for a Bi-Directional Parallel-Peripheral Interface for Personal Computers: IEEE P1284 D2.00 Sep. 10, 1993".

In this example, when the compatibility mode is selected, the open-collector drive is selected as a drive method, and when the Nibble mode or the ECP mode is selected, the totem-pole drive is selected as the drive method. The selection is realized by transmitting communication-mode change information from the host computer 3000 to the printer 1500 in the negotiation as shown in FIG. 6.

First, the operation of the host computer side will be described with reference to FIG. 7. Immediately after the start-up, the communication mode is set to the compatibility mode. At step S701, communication-mode change information corresponding to another communication mode to be set (e.g., compatibility mode) is obtained. At step S702, the obtained communication-mode change information is outputted onto the signal line Data (502) (Event 0).

At step S703, the signal line nSelectIn (505) is set to the H level, and the signal line nAutoFd (503) is set to the L level. This causes the printer 1500 to recognize communication-mode change (negotiation). Note that in the above communication protocol, when the signal line nSelectIn (505) is at the L level, the compatibility mode is selected as the communication mode, and the transition from the L level to the H level indicates communication-mode change from the compatibility mode to another mode (Nibble mode, ECP mode and the like). Note that the communication-mode change is completed upon the completion of negotiation.

The operation at steps subsequent to step S703 is as described in the first to third embodiments.

In the present example, the output of communication-mode change information to the printer 1500 is instruction to change communication mode as a drive method (e.g., open-collector drive method), and it is also instruction to change communication mode as a communication protocol (e.g., compatibility mode).

Next, the operation of the printer side will be described with reference to FIG. 10. As the power is turned on at step S1001, the printer 1500 recognizes that the signal line nSelectIn (505) is at the L level (in compatibility mode), and initializes the drive method to open-collector drive by setting the control signal DRVSEL to the L level. Note that when the host computer 3000 normally operates or when the power is not turned on, negotiation between the host computer and the printer has not been made at step S1001, therefore the signal line nSelectIn (505) is at the L level.

At step S1003, communication-mode setting is performed. Specifically, a communication mode (e.g., totem-pole drive) as a drive method and a communication mode (e.g., ECP mode) as a communication protocol are set based on the communication-mode change information.

Note that the operation at steps S1002 and that at S1004 are the same as those in the first to third embodiments.

As described above, in this example, based on the instruction from the host computer 3000, when a communication mode as a communication protocol is changed, a communication mode as a drive method is also changed. That is, when the compatibility mode is changed to another mode, the drive method is changed from open-collector drive to totem-pole drive.

According to this example, in a case where compatibility mode is set by the host computer, the drive method of an interface circuit is set to the open-collector drive, and in a case where another communication mode is set, the drive method of the interface circuit is set to the totem-pole drive. This enables high-speed communication in any of communication modes except the compatibility mode while maintaining compatibility of the compatibility mode.

Further, conventionally, in a case where the power of the host computer is turned off and the power of the printer is turned on, some host computer fail to normally turn on their power, since a limiter operates due to occurrence of overcurrent at their interface circuit. However, according to the present example, since the signal line nSelectIn is at the L level when the power of the host computer is turned off, it is considered that the printer is in the compatibility mode, and the interface circuit of the printer is forcibly set to the open-collector drive. Accordingly, overcurrent at the interface circuit of the host computer can be prevented, thus the power of the host computer can be normally turned on.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As described above, the present invention provides an electronic device which can be appropriately connected to external devices having various specifications.

The present invention is not limited to the above embodiments and various changes and modifications can be made within the spirit and scope of the present invention. Therefore, to appraise the public of the scope of the present invention, the following claims are made.

What is claimed is:

1. An apparatus for communicating with an external device via a communication interface, the apparatus having a plurality of communication modes in which transmission rate capabilities are different from each other, said apparatus comprising:

an acquisition unit, arranged to acquire a communication mode change request from the external device via the communication interface;

a plurality of drive circuits; and a setting unit, arranged to set one of the plurality of communication modes by selecting one of said plurality of drive circuits based on the communication mode change request acquired by said acquisition unit, wherein the selected drive circuit electrically drives a communication signal line of the communication interface.

2. The apparatus according to claim 1, wherein said plurality of drive circuits include a first drive circuit adapted to drive the communication signal line in an open-collector drive manner and a second drive circuit adapted to drive the communication signal line in a totem-pole drive manner.

3. The apparatus according to claim 1, wherein said plurality of drive circuits drive the communication signal line with signal voltage swings different from each other.

4. The apparatus according to claim 1, wherein the communication interface includes a bidirectional parallel interface.

5. The apparatus according to claim 1, wherein the external device comprises a host computer.

6. The apparatus according to claim 1, further comprising an image former, arranged to form an image based on information inputted from the external device via the communication interface.

7. The apparatus according to claim 6, wherein said image former forms the image by an electrophotographic method.

8. The apparatus according to claim 6, wherein said image former forms the image by an ink-jet method.

9. A system comprising a plurality of devices connected with each other via a communication interface, wherein a first device of said plurality of devices comprises a selection-information supplier, arranged to supply selection information via the communication interface, and wherein a second device of said plurality of devices comprises a signal line driver unit, arranged to select one of a plurality of drive methods based on the selection information supplied by the selection information supplier, and further arranged to electrically drive at least one communication signal line of the communication interface according to the selected drive method.

10. The system according to claim 9, wherein the second device further comprises a setter, arranged to set an input method for capturing a signal on the at least one communication signal line in correspondence with the selected drive method.

11. The system according to claim 9, wherein the plurality of drive methods, selectable by the signal line driver unit, includes a first drive method for electrically driving the at least one communication signal line in an open-collector drive manner and a second drive method for electrically driving the at least one communication signal line in a totem-pole drive manner.

12. The system according to claim 9, wherein the plurality of drive methods includes a drive method for electrically driving the at least one communication signal line with signal voltage swings different from each other.

13. The system according to claim 9, wherein the communication interface includes a communication path for a bidirectional parallel interface.

14. The system according to claim 9, wherein the selection information is information for selecting a communication mode for communicating between said plurality of devices.

15. A method of negotiating for communication with an external device via a communication interface, the communication being performed under one of a plurality of communication modes in which transmission rate capabilities are different from each other, said method comprising:
  an acquisition step of acquiring a communication mode change request from the external device via the communication interface; and
  a drive step of setting one of the plurality of communication modes by selecting one of a plurality of drive circuits based on the communication mode change request acquired in said acquisition step and electrically driving a communication signal line of the communication interface by the selected drive circuit.

16. The method according to claim 15, wherein the plurality of drive methods includes a first drive method for driving the at least one communication line in an open-collector drive manner and a second drive method for driving the at least one communication line in a totem-pole drive manner.

17. The method according to claim 15, wherein the plurality of drive methods includes a plurality of drive methods for driving the at least one communication line with signal voltage swings different from each other.

18. The method according to claim 15, wherein the communication interface includes a communication path for a bidirectional parallel interface.

19. The method according to claim 15, wherein the selection information is information for selecting a communication mode for communicating with the external device.

20. An apparatus for performing communication in accordance with IEEE Standard 1284, said apparatus comprising:
  a signal line driver unit, arranged to electrically drive a communication signal line; and
  an output controller, arranged to cause said signal line driver unit to drive the communication signal line by a first drive method when a compatibility mode is set as a communication mode, and to cause said signal line driver unit to drive the communication signal line by a second drive method different from the first drive method when a Nibble mode or an ECP mode is set as the communication mode.

21. The apparatus according to claim 20, wherein the first drive method is an open-collector drive method, and the second drive method is a totem-pole drive method.

22. The apparatus according to claim 20, wherein the first and second drive methods are drive methods for driving the communication line with signal voltage swings that are different from each other.

23. The apparatus according to claim 20, further comprising:
  an input unit, arranged to capture a signal on the communication line; and
  an input controller, arranged to cause said input unit to capture the signal on the communication line by a first input method when the compatibility mode is set as the communication mode, and to cause said input unit to capture the signal on the communication line by a second input method different from the first input method when the Nibble mode or the ECP mode is set as the communication mode.

24. The apparatus according to claim 23, wherein said input unit includes:
  a plurality of input devices, including input terminals connected to the communication line, and employing reference values different from each other; and
  a selection device for selectively outputting from one of the plurality of input devices based on the communication mode.

25. The apparatus according to claim 20, further comprising a transmitter, arranged to transmit print information to a printer via the communication line in accordance with IEEE Standard 1284.

26. The apparatus according to claim 20, further comprising:
  a receiver, arranged to receive print information via the communication line in accordance with the IEEE Standard 1284; and
  an image former, arranged to form an image based on the received print information.

27. The apparatus according to claim 26, wherein said image former forms the image by an electrophotographic method.

28. The apparatus according to claim 26, wherein said image former forms the image using an ink-jet method.

29. The apparatus according to claim 20,
  wherein said signal line driver unit includes:
    a 3-state buffer; and
    a logic circuit, arranged to input an internal signal, indicating a same logic level as an output signal to be outputted from the 3-state buffer, and a signal corresponding to the communication mode, and to generate an output signal to be supplied to an input terminal of the 3-state buffer and a control signal to be supplied to an enable terminal of the 3-state buffer, and
  wherein the first drive method is an open-collector drive method, and the second drive method is a totem-pole drive method.

30. An apparatus for performing communication in accordance with IEEE Standard 1284, comprising:
  an input unit, arranged to capture a signal on a communication line; and
  an input controller, arranged to cause said input unit to capture the signal on the communication line by a first input method when the compatibility mode is set as a communication mode, and to cause said input unit to capture the signal on the communication line by a second input method different from the first input method when a Nibble mode or an ECP mode is set as the communication mode.

31. The apparatus according to claim 30, wherein said input unit includes:
   a plurality of input devices, including input terminals connected to the communication line, and employing reference values different from each other; and
   a selection device for selectively outputting from one of the plurality of input devices based on the communication mode.

32. The apparatus according to claim 30, further comprising a transmitter, arranged to transmit print information to a printer via the communication line in accordance with the IEEE Standard 1284.

33. The apparatus according to claim 30, further comprising:
   a receiver, arranged to receive print information via the communication line in accordance with the IEEE Standard 1284; and
   an image former, arranged to form an image based on the received print information.

34. The apparatus according to claim 33, wherein said image former forms the image by an electrophotographic method or an ink-jet method.

35. A method of performing communication in accordance with IEEE Standard 1284, comprising:
   a drive step of electrically driving a communication signal line with a drive unit; and
   an output control step of causing the drive unit to electrically drive the communication signal line by a first drive method when a compatibility mode is set as a communication mode, and causing the drive unit to drive the communication line by a second drive method different from the first drive method when a Nibble mode or an ECP mode is set as the communication mode.

36. The method according to claim 35, wherein the first drive method is an open-collector drive method, and the second drive method is a totem-pole drive method.

37. The method according to claim 36, wherein the drive unit includes:
   a 3-state buffer; and
   a logic circuit, arranged to input an internal signal, indicating a same logic level as an output signal to be outputted from the 3-state buffer, and a signal corresponding to the communication mode, and to generate an output signal to be supplied to an input terminal of the 3-state buffer and a control signal to be supplied to an enable terminal of the 3-state buffer.

38. The method according to claim 35, wherein the first and second drive methods are drive methods for driving the communication signal line with signal voltage swings different from each other.

39. The method according to claim 35, further comprising:
   an input step of capturing a signal on the communication line with an input unit; and
   an input control step of causing said input step to capture the signal on the communication signal line with a first input method when the compatibility mode is set as the communication mode, and causing said input step to capture the signal on the communication line by a second input method different from the first input method when the Nibble mode or the ECP mode is set as the communication mode.

40. The method according to claim 39, wherein the input unit includes:
   a plurality of input devices, including input terminals connected to the communication line, and employing reference values different from each other; and
   a selection device for selectively outputting from one of the plurality of input devices, based on the communication mode.

41. The method according to claim 35, further comprising a transmission step of transmitting print information to a printer via the communication signal line in accordance with the IEEE Standard 1284.

42. The method according to claim 35, further comprising:
   a reception step of receiving print information via the communication signal line in accordance with IEEE Standard 1284; and
   an image formation step of forming an image based on the received print information.

43. The method according to claim 42, wherein, in said image formation step, the image is formed by an electrophotographic method.

44. The method according to claim 42, wherein, in said image formation step, the image is formed by an ink-jet method.

45. A method of performing communication in accordance with IEEE Standard 1284, comprising:
   an input step of capturing a signal on a communication line by an input unit; and
   an input control step of causing said input step to capture the signal on the communication line by a first input method when the compatibility mode is set as the communication mode, and causing said input step to capture the signal on the communication line by a second input method different from the first input method when the Nibble mode or the ECP mode is set as the communication mode.

46. The method according to claim 45, wherein the input unit includes:
   a plurality of input devices, including input terminals connected to the communication line, and employing reference values different from each other; and
   a selection device for selectively outputting from one of the plurality of input devices, based on the communication mode.

47. The method according to claim 45, further comprising a transmission step of transmitting print information to a printer via the communication line in accordance with the IEEE Standard 1284.

48. The method according to claim 45, further comprising:
   a reception step of receiving print information via the communication line in accordance with the IEEE Standard 1284; and
   an image formation step of forming an image based on the received print information.

49. The method according to claim 48, wherein, in said image formation step, the image is formed by an electrophotographic method or an ink-jet method.

* * * * *

UNITED STATES PATENT AND TRADEMARK OFFICE
CERTIFICATE OF CORRECTION

PATENT NO.     : 6,499,069 B1
DATED          : December 24, 2002
INVENTOR(S)    : Akihiro Shimura It is certified that error appears in the above-identified patent and that said Letters Patent is hereby corrected as shown below:

<u>Title page,</u>
Item [57], ABSTRACT,
Lines 7 and 8, "a" should read -- an --.

<u>Column 5,</u>
Line 22, "change" should read -- changing --.

<u>Column 7,</u>
Line 61, "enables" should read -- enabling --.

<u>Column 9,</u>
Lines 36 and 44, "become into" should read -- proceeded to --.
Line 50, "it" should read -- there --.
Line 51, "is waited" should read -- is a wait --.

<u>Column 10,</u>
Line 4, "it" should be deleted.
Lines 13 and 21, "circuit" should read -- circuits --.
Line 20, "circuit" (first occurrence) should read -- circuits --.
Line 30, "bipoler" should read -- bipolar --.
Line 35, "limits" should read -- limit --.
Line 60, "change" should read -- changing --.

<u>Column 11,</u>
Lines 10 and 14, "which" should read -- which point --.

<u>Column 12,</u>
Line 18, "be" should be deleted.
Line 19, "corresponding" should read -- correspond --.
Lines 23 and 24, "circuit" (second occurrence) should read -- circuits --.
Line 43, "by" (first occurrence) should be deleted.

<u>Column 13,</u>
Lines 3 and 7, "becomes into" should read -- proceeds to --.
Line 23, "selects" should read -- it selects --.

UNITED STATES PATENT AND TRADEMARK OFFICE
CERTIFICATE OF CORRECTION

PATENT NO. : 6,499,069 B1
DATED : December 24, 2002
INVENTOR(S) : Akihiro Shimura It is certified that error appears in the above-identified patent and that said Letters Patent is hereby corrected as shown below:

Column 15,
Line 34, "computer" should read -- computers --.

Signed and Sealed this

Eighth Day of July, 2003

JAMES E. ROGAN
*Director of the United States Patent and Trademark Office*